US006830716B2

(12) United States Patent
Daihisa et al.

(10) Patent No.: US 6,830,716 B2
(45) Date of Patent: Dec. 14, 2004

(54) METHOD OF REMOVING EXTRANEOUS MATTER FROM INJECTION MOLD

(75) Inventors: Takuji Daihisa, Kanagawa (JP); Mitsugu Konno, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 63 days.

(21) Appl. No.: 10/157,967

(22) Filed: May 31, 2002

(65) Prior Publication Data

US 2002/0185766 A1 Dec. 12, 2002

(30) Foreign Application Priority Data

| Jun. 6, 2001 | (JP) | ............................ 2001-171539 |
| Jun. 18, 2001 | (JP) | ............................ 2001-183982 |
| Jun. 27, 2001 | (JP) | ............................ 2001-193982 |

(51) Int. Cl.[7] ........................ B29C 45/53; B29C 45/63
(52) U.S. Cl. ........................ 264/39; 264/102; 264/335
(58) Field of Search ................ 264/39, 101, 102, 264/271.1, 275, 276, 334, 335, 510, 511, 513; 425/129.1, 546, 553, 554, 556

(56) References Cited

U.S. PATENT DOCUMENTS

| 3,607,569 | A | * | 9/1971 | Greenwell ................ 249/115 |
| 3,645,319 | A | * | 2/1972 | Pondelicek et al. .......... 164/72 |
| 4,064,208 | A | * | 12/1977 | Hanning ...................... 264/39 |
| 4,164,523 | A | * | 8/1979 | Hanning ...................... 264/28 |
| 4,639,341 | A | * | 1/1987 | Hanamoto et al. ........ 264/40.1 |
| 4,679,997 | A | * | 7/1987 | Plenzler et al. .......... 425/126.1 |
| 4,787,436 | A | * | 11/1988 | Ozeki et al. ................ 164/305 |
| 4,976,900 | A | * | 12/1990 | Tsutsumi ..................... 264/39 |
| 5,073,329 | A | * | 12/1991 | Carrara .................... 264/297.5 |
| 5,174,932 | A | * | 12/1992 | Johnson et al. ............... 264/39 |
| 5,344,596 | A | * | 9/1994 | Hendry ..................... 264/40.3 |
| 5,397,230 | A | * | 3/1995 | Brew .......................... 425/546 |
| 5,454,991 | A | * | 10/1995 | Brew .......................... 264/39 |
| 5,665,281 | A | * | 9/1997 | Drummond ................ 264/39 |
| 5,820,813 | A | * | 10/1998 | Hara et al. .................. 264/511 |
| 5,961,898 | A | * | 10/1999 | Higashida et al. ............ 264/39 |
| 5,972,279 | A | * | 10/1999 | Harris et al. ................ 264/513 |
| 6,071,463 | A | * | 6/2000 | De'ath .................... 264/328.16 |
| 6,294,126 | B1 | * | 9/2001 | Eckardt et al. ............. 264/500 |
| 6,325,955 | B1 | * | 12/2001 | Herbst ....................... 264/40.5 |
| 6,676,867 | B2 | * | 1/2004 | Tsuchiya et al. ............. 264/83 |

* cited by examiner

Primary Examiner—Angela Ortiz
(74) Attorney, Agent, or Firm—Sughrue Mion, PLLC

(57) ABSTRACT

When resins are injected into a cavity of an injection mold separably formed of a movable mold and an immovable mold to form a casting, a high-pressure gas is supplied into the cavity during a time period after completion of forming the casting till the injection mold opens partway, and the high-pressure gas is allowed to jet out through a clearance formed between joint surfaces of the movable and immovable molds while the injection mold is opening. More than one attraction gripper is used to hold, move and place an insert at a predetermined position in the injection mold. Magnetic shielding is provided between the injection mold and a magnet embedded at the predetermined position in the injection mold to restrict a leakage of a magnetic flux into the injection mold.

6 Claims, 18 Drawing Sheets

METHOD OF REMOVING EXTRANEOUS MATTER FROM INJECTION MOLD

BACKGROUND OF THE INVENTION

This invention relates generally to injection molding, and particularly to a method of removing extraneous matter (e.g., a nonvolatile component of plastic substance) generated in a cavity of an injection mold comprised of a movable mold and an immovable mold, and a method of precisely and securely placing an insert in the injection mold.

In general, an injection-molding machine includes an injection mold comprised of a movable mold and an immovable mold, and moldably fluidized resins are injected into a mold cavity of the injection mold formed of the movable mold and the immovable mold, to form a casting. Between joint surfaces of the movable and immovable molds of a conventional injection mold is provided a small clearance through which air and gas in the cavity may be evacuated, and a gas vent is connected to the clearance. The clearance is configured to have such a small size that only air in the cavity and gas emitted from the fluidized resins (hereinafter referred to as "atmosphere in the cavity") may pass through the clearance, thus distributing the fluidized resins throughout whole space in the cavity.

To attach a part to a casting, the part may be joined integrally by means of thermal caulking with the casting that has been formed through an injection-molding process, or the part may be inserted in a mold during the injection-molding process to get integrally molded. However, the method of joining the part by means of thermal caulking has rarely been used because of low productivity thereof.

When a metal insert made of iron or containing great amounts of iron is embedded in the casting through the process of inserting the part in the mold, a concave holding portion in which the insert is placed is provided in the mold cavity. The holding portion may be magnetized for the purpose of securely holding the insert in the mold cavity. Alternatively, a magnet may be embedded in the holding portion to bold the insert.

FIGS. 12A and 12B illustrate a conventional handling device that places the insert in the holding portion. As shown in FIGS. 12A and 12B, the handling device 1 includes an attraction gripper 3 that attracts an insert 2, and an arm that moves and places the insert 2 attracted to the attraction gripper 3 at an insert position in an injection mold (not shown). The handling device 1 moves and rotates the arm 4 with the insert 2 attracted thereto in frontward, rearward, left-hand, right-hand, upward, and downward directions, and thereby properly positions the insert 2 in the injection mold (not shown).

The arm 4 is constituted, for example, of a jointed-arm robot; the attraction gripper 3, which is made of rubber in its entirety, is attached to a head 5 at a distal end of the arm 4. At a bottom of the attraction gripper 3 is provided an annular groove 3a between concentric inner and outer annular sections 3b and 3c to exert negative pressure on the insert 2. At a bottom of the annular groove 3a are provided a plurality of suction inlets 3d, 3d, . . . Each suction inlet 3d is connected to a negative pressure passage 3e in the head 5, and the negative pressure passage 3e is connected via a control valve (not shown) to a vacuum pump or vacuum tank (not shown).

When the handling device 1 is employed to position an insert 2 in the injection mold, first, the arm 4 is actuated to move and rotate in frontward, rearward, left-hand, right-hand, upward, and downward directions, to move the head 5 to a position where the insert 2 is picked up, so that the outer annular section 3b and the inner annular section 3c face target spots on the insert 2. This position being kept, the control valve is then switched to a position at which the negative pressure passage 3e opens connections to the vacuum pump or vacuum tank so that negative pressure is created in the annular groove 3a to exert an attraction.

The negative pressure attracts the insert 2 to the annular groove 3a. When the insert 2 is attracted to the annular groove 3a, the arm 4 is next operated to move and rotate in frontward, rearward, left-hand, right-hand, upward, and downward directions to move and attach the insert 2 to the holding portion in the injection mold. Subsequently, the control valve is switched to a position at which the negative pressure passage 3e opens connections to an atmosphere discharge port of the control valve to release the insert 2 from the attraction gripper 3. Thereafter, the arm 4 is operated to move the head 5 back to the position where the insert 2 is picked up.

Accordingly, a series of operations from the step of picking up the insert 2 to the step of moving the head 3 back to a home position is repeatedly performed for one cycle of the injection-molding process, with the result that productivity in embedding an insert in the casting may be enhanced in comparison with that which may be achieved through a thermal caulking process. To control the position of the arm 4 and the positioning of the insert 2, a contact sensor such as a microswitch, a relay, etc., or a noncontact sensor such as a magnetic sensor, an optical sensor, etc. may be used.

As described above, when the conventional injection mold is employed, fluidized resins are distributed throughout whole space in the cavity, and are solidified under such a condition as to allow entire inner surfaces of the cavity to be kept in full contact with the fluidized resins, so that castings without defect in outer surfaces or inner structures may be formed. However, nonvolatile components (e.g., flame retardant for suppressing propagation of a flame, additives for improving fluidity of resins, etc.) that exude from the fluidized resins may cool off and deposit on inner surfaces of the cavity, a land, and the like. The extraneous matters that deposit in the cavity may inhibit an atmosphere in the cavity from coming out, thus decreasing yields of the castings. In addition, the increased extraneous matters derived from nonvolatile components would disadvantageously adhere to the casting.

Accordingly, the extraneous matters derived from the nonvolatile components are removed once a day, or an evacuator circuit that evacuates the nonvolatile components outside by exerting negative pressure in the cavity is provided, so that the casting may be taken out of the cavity after the atmosphere in the cavity filled with fluidized resins is evacuated outside.

However, the former approach disadvantageously requires a temporal suspension of a line for a cleaning operation, and needs enormous manpower and time for dismantling the injection mold. On the other hand, the latter approach using an evacuator may fail to bring about sufficient cleaning effects by a scant one atmospheric pressure, thus decreasing reliability.

The use of the handling device 1 to locate the insert 2 at a holding portion in an injection mold where the insert 2 is held by a magnetic attraction of the holding portion, as described above, would make it possible to automate an insert positioning operation. However, if the insert 2 formed by performing a press-forming or stamping process assumes a curved or uneven shape as shown in FIG. 13A, the attraction gripper 3 may get into contact with a wrong spot on the insert 2 deviated from an appropriate spot to attract the insert 2, or a gap may be generated between the outer annular section 3b or the inner annular section 3c and a surface of the insert 2. Such a deviated spot of contact would require a delicate operation of correcting a position of the insert 2 by actuating the arm 4 to move and suspend in a finely modulated manner. Further, thus-generated gap would cause a negative pressure to decrease, and allow the insert 2 to fall off from the attraction gripper 3, disadvantageously resulting in failure to place the insert 2 in the holding portion. Otherwise, wear-out generated in the outer annular section 3b and the inner annular section 3c due to normal wear and tear or deterioration over time as shown in FIG. 13B would pose the same problem as described above.

Moreover, the insert 2 is likely to fall off from the holding portion due to oscillations or the like. In case where an inner surface of the holding portion is magnetized or a magnet is embedded in the holding portion to hold the insert using a magnetic force, the magnetic force is disadvantageously abated, thus making a magnetic attraction for holding the insert less than that which is exerted in case where a bare magnet is brought into direct contact with the insert to attract and hold the insert. More specifically, this is because a magnetic attraction of the magnet embedded in a surface of a mold cavity would abate because of a leakage of a magnetic flux into a mold made of metal materials.

The present invention has been made in order to eliminate the above disadvantages.

SUMMARY OF THE INVENTION

Therefore, it is an exemplified general object of the present invention to provide a method for improving yields of final castings and enhancing productivity in the injection-molding process.

Another exemplified and more specific object of the present invention to provide a method of discharging a nonvolatile component from a cavity of an injection mold without suspension of operations in an injection-molding line and without disassembling the injection mold.

Yet another exemplified object of the present invention is to provide a method of moving and placing an insert at a predetermined position in the injection mold without letting the insert fall off.

Yet another exemplified object of the present invention is to provide a method for preventing a magnetic attraction of a holding portion in the injection mold from abating due to a leakage of a magnetic flux.

In order to achieve the above objects, there is provided, as one aspect of the present invention, a method of removing extraneous matter in an injection mold having a cavity comprised of a movable mold and an immovable mold into which injection mold a resin is injected to form a casting. The method includes supplying a high-pressure gas into the cavity during a time period after completion of forming the casting till the injection mold opens partway, and allowing the high-pressure gas to jet out through a clearance formed between joint surfaces of the movable and immovable molds while the injection mold is opening, whereby a nonvolatile component of the resin is discharged.

According to this method, a high-pressure gas is supplied into the cavity after completion of forming the casting till the injection mold opens partway, so that the high-pressure gas is allowed to jet out through the clearance formed between joint surfaces of the movable and immovable molds while the injection mold is opening; thus, a rush of the high-pressure gas jetted out removes a non-volatile component in the cavity. In addition, such a rush of the high-pressure gas jetted out serves to clean the surfaces inside the cavity and the joint surfaces of the movable and immovable molds.

Preferably, the movable mold may be configured to move at a very low velocity for only an initial period of time while the injection mold is opening, keeping the clearance very small to improve a cavity cleaning effect of the high-pressure gas. Alternatively, the clearance formed between joint surfaces of the movable and immovable molds is restricted to a very small level for a predetermined period immediately after the injection mold starts opening, and the movable mold is allowed to move at a normal velocity after an expiration of the predetermined period. The cavity cleaning effect of the high-pressure gas may be improved in this configuration as well.

The above-described constructions may prevent the joint surfaces of the movable and immovable molds from opening too quickly, so that a high-pressure gas may act on the small clearance formed between the immovable and movable molds for a longer time period. Consequently, the effect of cleaning a nonvolatile component is noticeably improved, and cleaning intervals may be prolonged.

The clearance formed between joint surfaces of the movable and immovable molds may preferably be determined according to viscosity of a material to be formed.

Optionally, an air pressure circuit (not shown) may preferably be provided in the movable and immovable molds to discharge atmosphere in the cavity, and the atmosphere in the cavity may be evacuated through a clearance formed between the joint surfaces of the land and the movable mold, before supplying the high-pressure gas into the cavity; thereafter, a nonvolatile component is discharged using a high-pressure gas as described above. Accordingly, reliability of the cleaning effect may be greatly increased, and a maintenance-free period may be extended longer.

Moreover, there is provided, as another aspect of the present invention, a method of placing an insert in an injection mold, in which a plurality of attraction grippers are used to hold, move and place the insert at a predetermined position in the injection mold.

Provision of the plurality of attraction grippers that hold an insert to place the insert in the projection mold may facilitate precise placement of the insert at a predetermined position in the projection mold because even if one of the attraction grippers fails to hold the insert, the others can hold the insert.

In this construction, the plurality of attraction grippers may preferably be attached to a head of a handling device, so that the head may be operated to place the insert at the predetermined position in the injection mold. Further, each of the plurality of attraction grippers may preferably be configured to hold and release the insert by switching between an attractive negative pressure and a positive pressure. In case where the insert is made of metal materials, the plurality of attraction grippers may preferably be made of electromagnets.

Moreover, as yet another aspect of the present invention, there is provided a method of placing an insert in an injection mold, in which a magnet is embedded at a predetermined position in the injection mold to attract and hold the insert at the predetermined position on an inner surface of a cavity of the injection mold; and in which magnetic shielding is provided between the injection mold and the magnet to restrict a leakage of a magnetic flux into the injection mold.

In this construction, a leakage of a magnetic flux into the injection mold typically made of metal materials may be restricted by the shielding provided between the injection mold and the magnet, and thus a magnetic attraction may be prevented from decreasing. Consequently, the insert may be securely held at the predetermined insert position.

Other objects and further features of the present invention will become readily apparent from the following description of preferred embodiments with reference to accompanying drawings.

DETAILED DESCRIPTION OF THE PREFERRED EMBODIMENTS

A description will now be given of the preferred embodiments of the present invention with reference to the drawings.

[First Embodiment]

Figure 1:
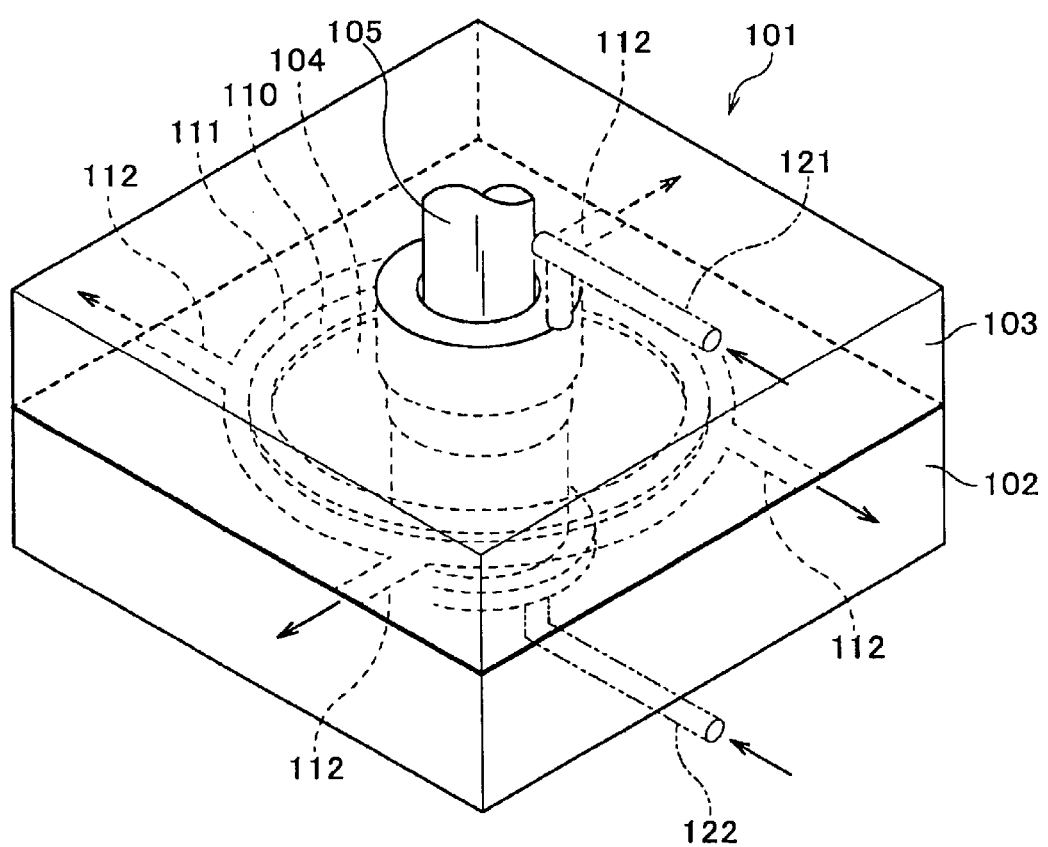
FIG. 1 is a perspective view of an outward appearance and internal components of an injection mold according to a first embodiment of the present invention.

Referring first to FIG. 1, a method of removing extraneous matter generated in a cavity of an injection mold according to the present invention will be described herein.

FIG. 1 shows an injection mold according to a first embodiment of the present invention. The injection mold 101 is composed principally of a movable mold 102 and an immovable mold 103. A joint surface of the movable mold 102 is brought into close contact with a joint surface of the immovable mold 103 to form a closed mold cavity 104, and then fluidized resins are injected into the cavity 104 to form a casting.

In the movable mold 102 and the immovable mold 103 respectively are provided gas vents 121, 122 each connected into the cavity 104, and a high-pressure gas is supplied through the gas vents 121, 122 into the cavity 104. The high-pressure gas is continuously supplied through the gas vents 121, 122 immediately after completion of injection of the fluidized resins into the cavity 104 composed of the movable mold 102 and the immovable mold 103 till the movable mold 102 and the immovable mold 103 are separated a predetermined distance to take out a casting. The thus-supplied high-pressure gas is jetted out through a clearance formed between the movable mold 102 and the immovable mold 103, so that a nonvolatile component is removed from the inside of the cavity 104 and discharged out with a rush of the high-pressure gas. If the movable mold 102 is configured to move at a very low velocity for an initial period of time while the injection mold is opening, to keep an opening of the mold very small, the high-pressure gas is jetted out in all directions through the small clearance between the movable mold 102 and the immovable mold 103; therefore, a nonvolatile component is effectively removed, and joint surfaces of the movable mold 102 and the immovable mold 103 are cleaned by the high-pressure gas moving along the joint surfaces of the movable mold 102 and the immovable mold 103. Accordingly, the movable mold 102 and the immovable mold 103 may be neatly fitted with each other, and thus precision with which a casting is molded is improved.

In order to improve reliability of an effect of discharging a nonvolatile component, an air pressure circuit (not shown) for evacuating an atmosphere in the cavity may be provided in the movable mold 102 and the immovable mold 103, so that the atmosphere in the cavity may be discharged before a high-pressure gas is jetted through the gas vents 121, 122, and thereafter a nonvolatile component may be discharged by supplying the high-pressure gas through the gas vents 121, 122. This configuration permits a long maintenance-free period.

Next, a description will be given of a specific example of a device for implementing the method of removing extraneous matter generated in an injection mold according to the present invention with reference to FIGS. 2 through 5.

Figure 2:
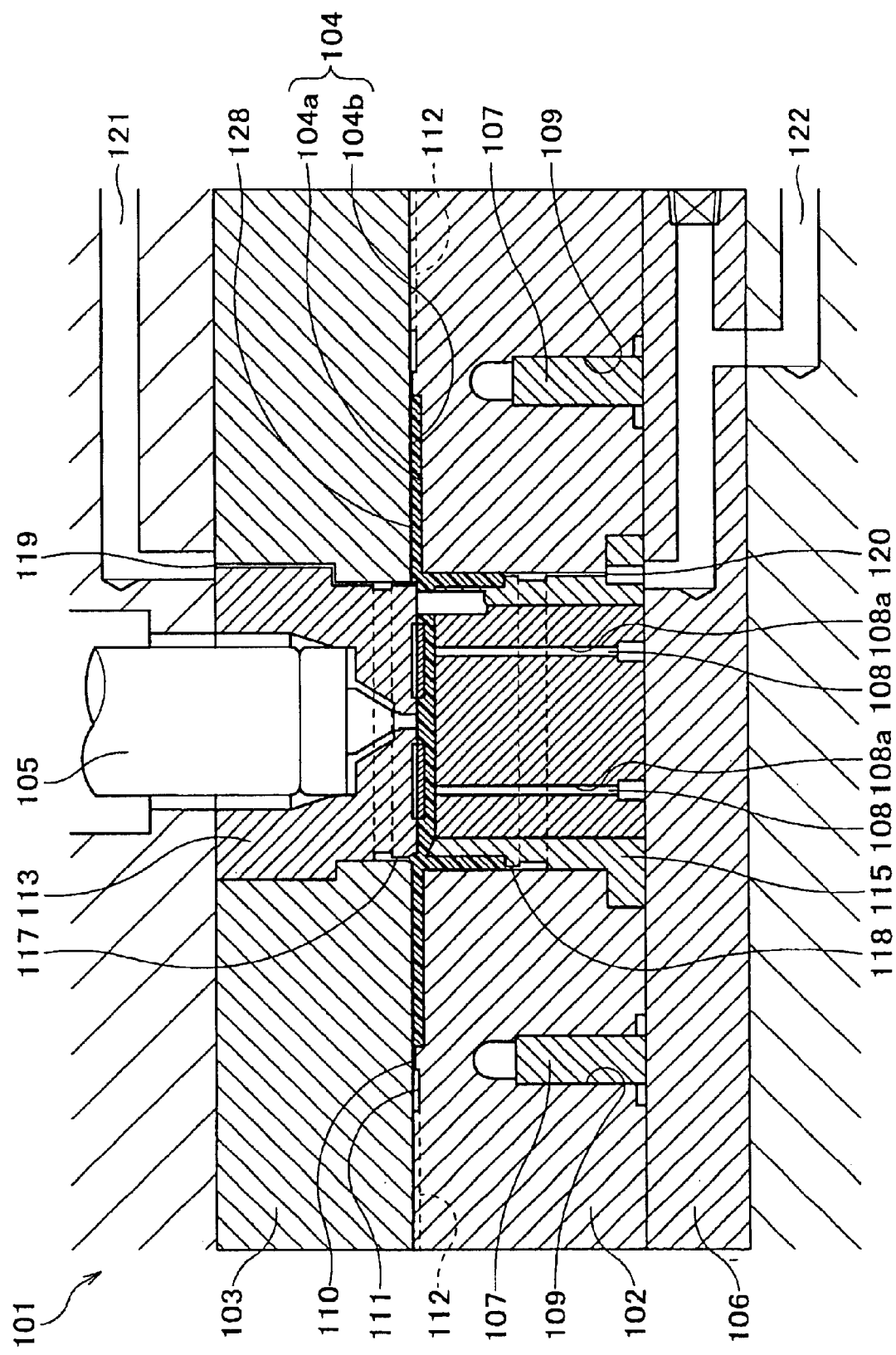
FIG. 2 is a cross section of an internal structure of the injection mold according to the first embodiment of the present invention.
Figure 3:
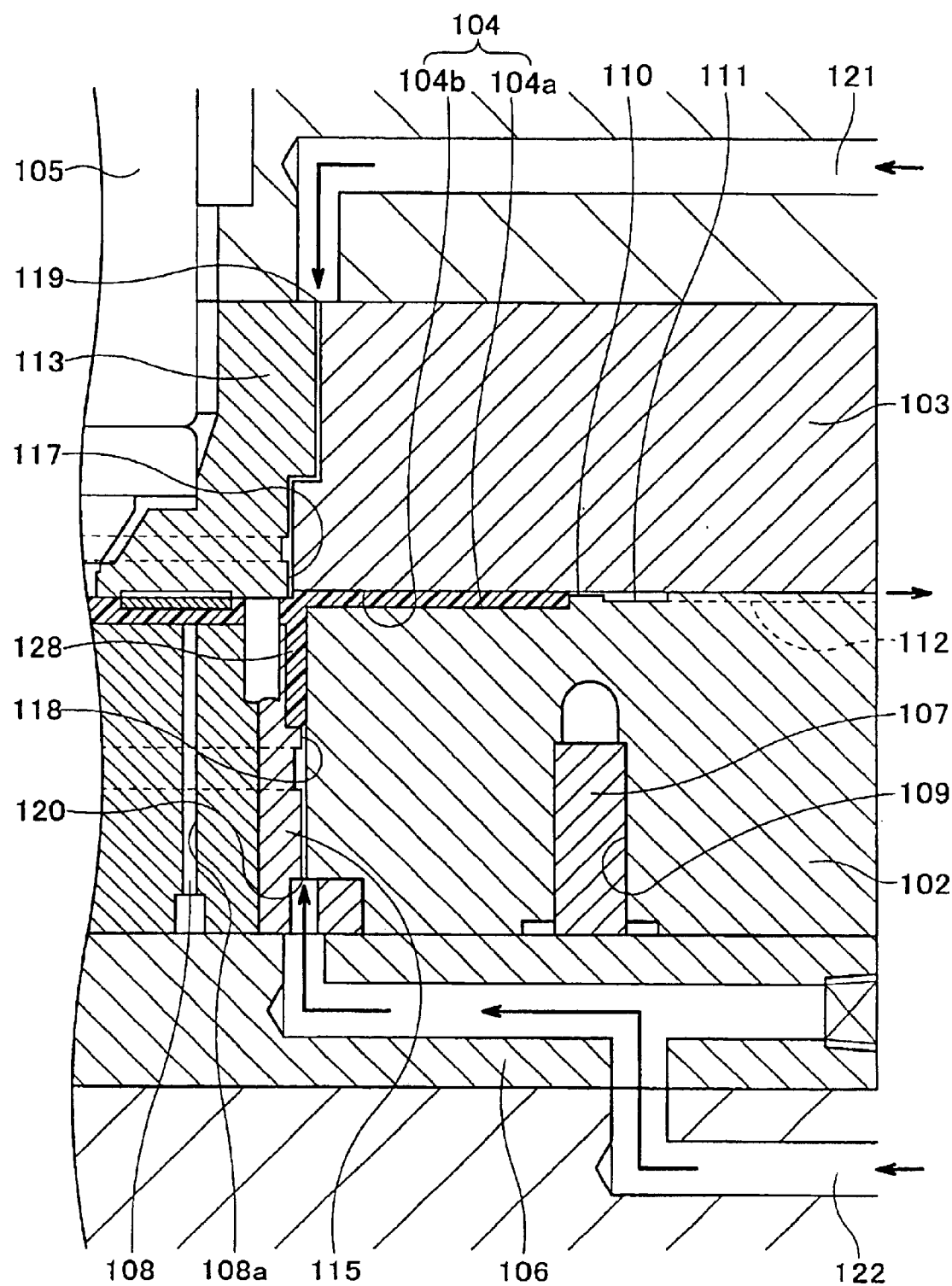
FIG. 3 is a cross section of the internal structure shown in FIG. 2, with a principal portion thereof enlarged and illustrated in detail, according to the first embodiment of the present invention.
Figure 4:
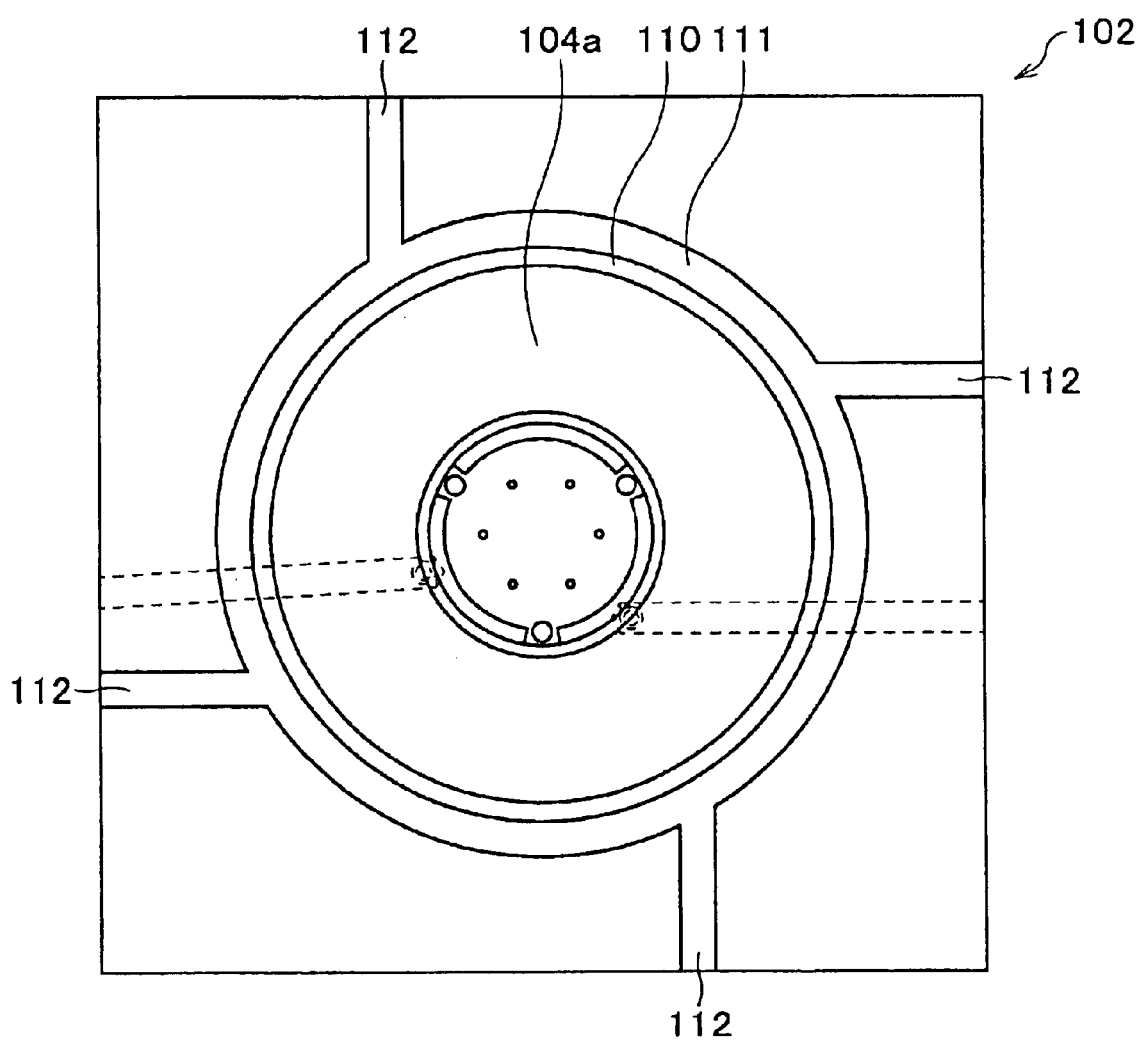
FIG. 4 is a plan view of a movable mold as viewed from an immovable-mold side according to the first embodiment of the present invention.
Figure 5:
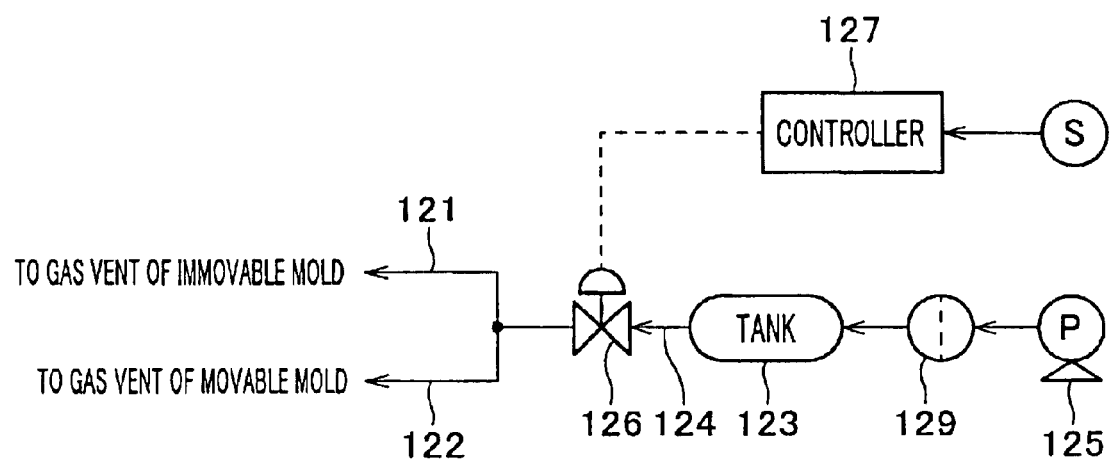
FIG. 5 is a block diagram showing one example of an air pressure circuit according to the first embodiment of the present invention.

FIG. 2 is a cross section of an internal structure of the injection mold; FIG. 3 is a cross section of the internal structure shown in FIG. 2, with a principal portion thereof enlarged and illustrated in detail; FIG. 4 is a plan view of a movable mold as viewed from an immovable-mold side; and FIG. 5 is a block diagram showing an air pressure circuit for supplying a high-pressure gas, e.g., high-pressure air, into the cavity.

As shown in FIGS. 2 and 3, the injection mold 101 is separably composed of a movable mold 102 and an immovable mold 103. The immovable mold 103 is provided with a nozzle 105 for jetting fluidized resins into the cavity 104 that is formed of a cavity surface 104a of the movable mold 102 and a cavity surface 104b of the immovable mold 103. To the nozzle 105 is attached a resin injection supplying device (not shown) for supplying pressurized fluidized resins to the nozzle 105.

The movable mold 102 is engaged with a pair of guide pins 107, 107 and a pair of extrusion pins 108, 108 fixed on a fixed base 106. The pair of guide pins 107, 107 and a corresponding pair of guide holes 109, 109 for guiding the guide pins 107, 107 are mounted respectively on the fixed base 106 and the movable mold 102 so that the joint surface of the movable mold 102 may be neatly fitted to the joint surface of the immovable mold 103. The pair of extrusion pins 108, 108 and a corresponding pair of extrusion pin guide holes 108a, 108a for slidably guiding the extrusion pins 108, 108 are mounted respectively on the fixed base 106 and the movable mold 102 so that distal ends of the extrusion pins 108, 108 may relatively protrude into the cavity surface 104a at the movable mold 102 side.

The movable mold 102 has a clearance formed between a land 110 thereof and the joint surface of the immovable mold 103 so that only the atmosphere in the cavity may be discharged through the clearance. The land 110 is provided on the joint surface of the movable mold 102 all around a joint portion to be joined with a cavity surface 104a at the movable mold 102 side (see FIG. 1), and is connected with the cavity surface 104a of the movable mold 102 at an upper side of the land 110. In the joint surface of the movable mold 102 are provided a ring-shaped groove 111 and a plurality of vents 112, 112, 112, 112 to collect and discharge the atmosphere in the cavity passing through the clearance between the land 110 and the joint surface of the immovable mold 103.

The above groove 111 is provided in a position outside the cavity surface 104a at the movable mold 102 side across the land 110. The groove 111 extends all around the land 110. Each of the vents 112, 112, 112, 112 has one end opening toward the ring-shaped groove 111, and the other end opening toward an outer surface of the movable mold 102.

Accordingly, when a resin injection supplying device of screw type or the like is actuated with the joint surfaces of the movable mold 102 and the immovable mold 103 kept in close contact with each other to inject a predetermined amount of fluidized resins from the resin injection supplying device into the cavity 104, the atmosphere in the cavity 104 is discharged through a small clearance between the joint surfaces of the land 110 and the immovable mold 103 to the ring-shaped groove 111 by thrusting pressure of the fluidized resins, and passes through the vents each connected to the groove 111 to the outside. On the other hand, the fluidized resins are distributed in the cavity 104 as the atmosphere in the cavity is discharged, so that the fluidized resins are solidified while keeping in close contact with an entire inner surface of the cavity 104.

During the above-described process, a nonvolatile component tends to exude from the fluidized resins and to accumulate, particularly, in a narrow gap in the land 110 or in a corner of the mold cavity 104.

Thus, as shown in FIG. 3 in detail, around an outer perimeter of a holder portion 113 for mounting a nozzle 105 in the immovable mold 103 and around an outer perimeter of an extrusion pin mounting portion 115 for mounting the extrusion pins 108, 108 in the movable mold 102, are provided lands 117, 118 for permitting passage of the high-pressure gas and vents 119 and 120 connected to each lands 117, 118, to connect gas vents 121, 122 to the vents 119, 120. As shown in FIG. 5, the gas vents 121, 122 are connected to a tank 123 for supplying the high-pressure gas through a gas supplying passage 124. The tank 123 is provided with a sensor (not shown) that detects an internal pressure of the tank, and a pressure-regulating valve (not shown) that regulates the internal pressure of the tank 123, so that a driving circuit of a compressor 125 connected with the tank 123 is switched between operation/suspension positions, thereby adjusting the internal pressure of the tank 123 to a predetermined pressure.

In the gas supplying passage 124, a control valve 126 for regulating timing and time of supply of the high-pressure gas is provided, and a detector means S for detecting molding completion timing is connected to a controller 127 for controlling the control valve 126. The controller 127 is comprised of a sequence circuit (including sequencer) having a timer, a relay, a speed controller, and the like, or a microcomputer composed primarily of a memory, an I/O, a CPU, and the like. The detector means S is composed of a quantity sensor (not shown) for controlling a quantity of resins to be supplied from the resin injection supplying device, and a movable mold position detecting sensor (not shown) for locating a position to which the movable mold 102 has moved. In FIG. 5 denoted by 129 is a mist separator.

The controller 127 determines that one cycle of the molding process using the injection mold 101 is complete when it is determined based upon a detection result of the quantity sensor that fluidized resins have been supplied in a predetermined quantity, and when it is determined based upon a detection result of the movable mold position detecting sensor that the movable mold 102 has been moved to a joint position. Accordingly, the controller 127 is programmed to operate the control valve 126 to keep opening until the movable mold 102 moves to a position where the mold opens at a predetermined opening. The controller 127 is further programmed to apply a pressure of a high-pressure gas into a clearance formed between the land 110 and the joint surface of the movable mold 103 immediately before starting to open the mold, and to apply a pressure of a high-pressure gas into a clearance formed between the joint surfaces of the movable mold 102 and the immovable mold 103 upon opening the mold so as to allow the high-pressure gas to jet out through the clearance with a rush.

Consequently, in such a device as described above, as in the method described with reference to FIG. 1, a nonvolatile component generated in the cavity 104 is discharged out of the cavity 104, and a defect in the final casting derived from the residual nonvolatile component and an undesired deposition of the nonvolatile component to the casting may be prevented. Further, supplying a high-pressure gas through each gas vent 121, 122 to apply a pressure of the high-pressure gas to a circumferential surface of a tubular portion of the casting 128 from outside permits the casting 128 to be smoothly pushed out by a extruding force of the extrusion pins 108, 108 even if a draft of the tubular portion is zero.

The movable mold may be configured to move at a low or very low velocity for only an initial period of time while the injection mold is opening, to improve a cleaning effect of the high-pressure gas for the cavity 104. Alternatively, the clearance formed between the joint surfaces of the movable and immovable molds 102, 103 may be restricted to a very small level for a predetermined period immediately after the injection mold starts opening, and the movable mold 102 may be allowed to move at a normal velocity after an expiration of the predetermined period. The cleaning effect of the high-pressure gas for the cavity 104 may be improved in this configuration as well.

The above-described constructions may serve to prevent the joint surfaces of the movable and immovable molds 102, 103 from opening too quickly, so that a high-pressure gas may act on the small clearance formed between the immovable and movable molds 102, 103 for a longer time period. Consequently, the effect of cleaning a nonvolatile component is noticeably improved, and cleaning intervals may be prolonged.

The clearance formed between the land 110 provided on the joint surface of the movable mold 102 as a gas vent and the joint surface of the immovable mold 103, and the clearance formed between the lands 17, 18 and a corresponding joint portion to which the lands 17, 18 are fitted may be determined according to viscosity of a material to be formed. For example, the clearance is 10 to 30 $\mu$m where PC (polycarbonate) is used for material to be formed; the clearance is 5 to 10-odd $\mu$m where POM (polyacetal) is used for material to be formed. In general, the clearance between joint surfaces of the land 110 and the immovable mold 103, and the clearance between the lands 117, 118 and a corresponding joint portion to which the lands are fitted are configured in the neighborhood of 10 $\mu$m. The length of the lands is configured in the neighborhood of 1.8 $\mu$m.

Additionally, an air pressure circuit (not shown) may be provided in the movable and immovable molds 102, 103 to discharge atmosphere in the cavity, and the atmosphere in the cavity may be evacuated through a clearance formed between the land 110 and the joint surface of the movable mold 103, before the controller 127 allows the high-pressure gas to jet into the cavity 104; thereafter, a nonvolatile component may be discharged using a high-pressure gas. Accordingly, reliability of the cleaning effect may be greatly increased, and a maintenance-free period may be extended longer.

In the above embodiment, the controller 127 is programmed to automatically clean extraneous matter in the cavity 104, but the control valve 126 may be switched with a manual switching operation to do cleaning.

[Second Embodiment]

Figure 6:
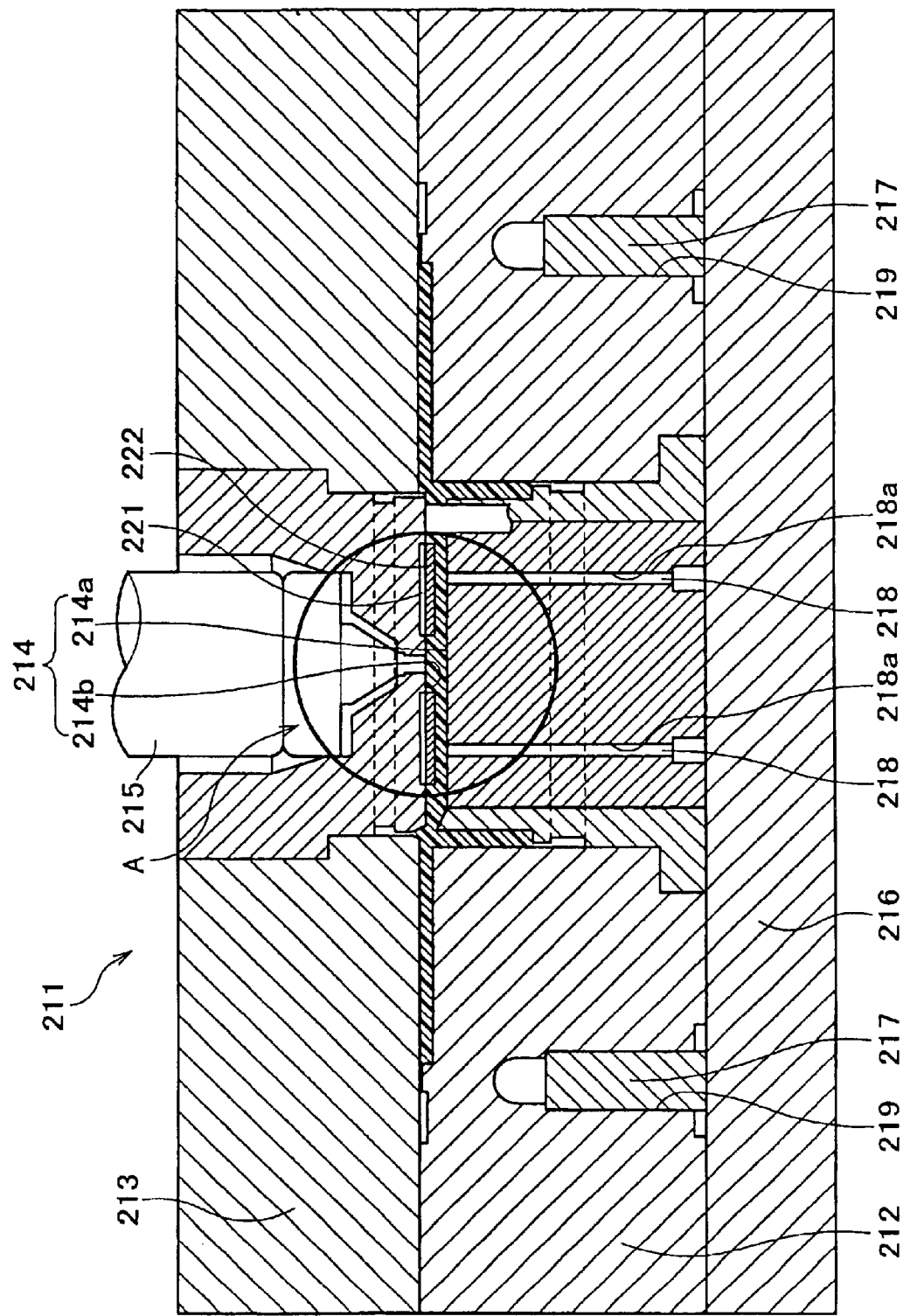
FIG. 6 is a cross section of an internal structure of an injection mold according to a second embodiment of the present invention.
Figure 7:
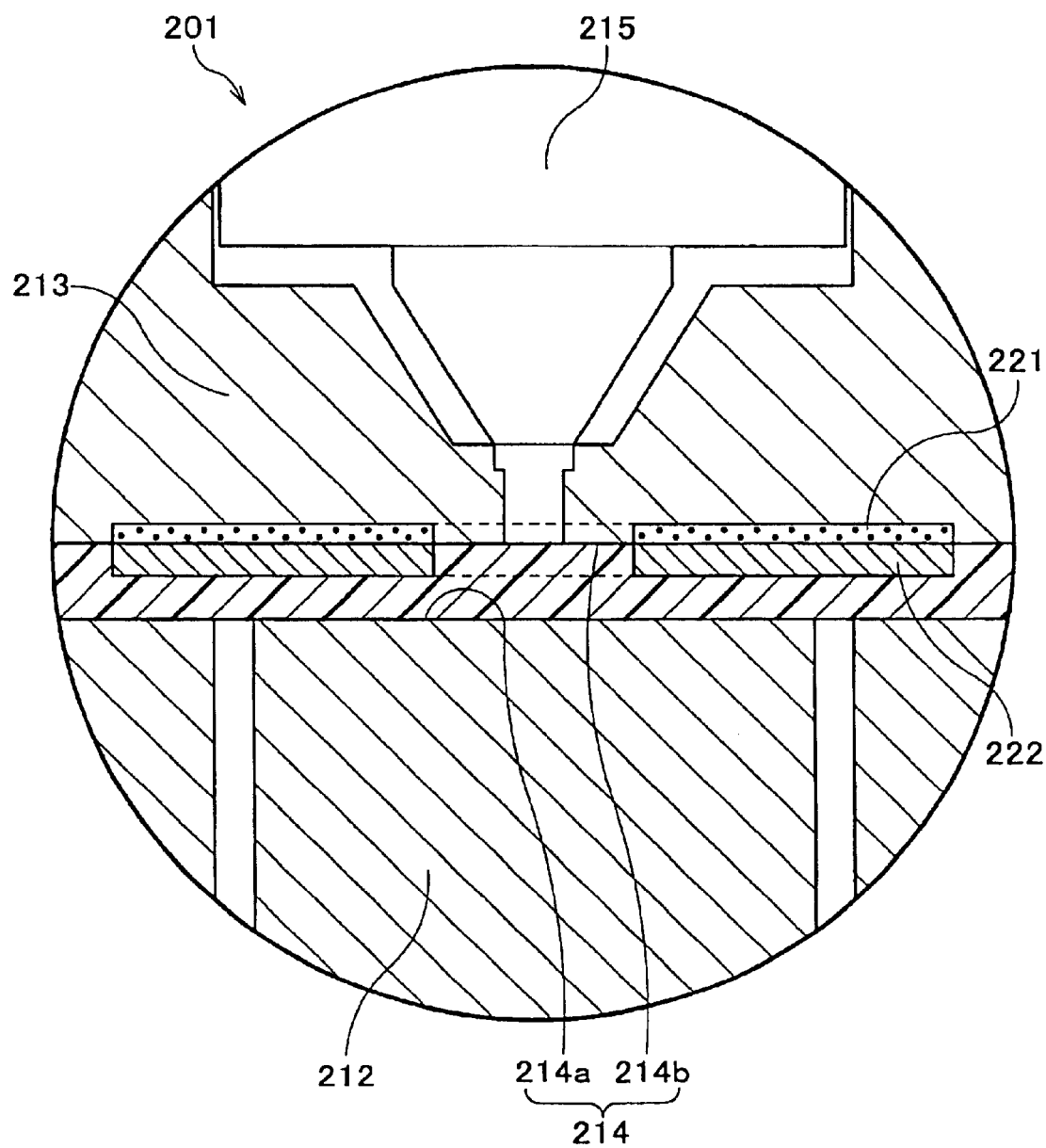
FIG. 7 is an enlarged cross section of a portion A of the injection mold shown in FIG. 6 according to the second embodiment of the present invention.

Referring to FIGS. 6 through 7, a specific example of an injection mold according to a second embodiment of the present invention will be described herein.

As shown in FIG. 6, an injection mold 211 is separably comprised of a movable mold 212 and an immovable mold 213. The immovable mold 213 is provided with a nozzle 215 for injecting fluidized resins into a cavity 214 formed of a cavity surface 214a of the movable mold 212 and a cavity surface 214b of the immovable mold 213. To the nozzle 215 is attached a resin injection supplying device (not shown) for supplying pressurized fluidized resins to the nozzle.

The movable mold 212 is engaged with a pair of guide pins 217, 217 and a pair of extrusion pins 218, 218 fixed on a fixed base 216. The pair of guide pins 217, 217 and a corresponding pair of guide holes 219, 219 for guiding the guide pins 217, 217 are mounted respectively on the fixed base 216 and the movable mold 212 so that the joint surface of the movable mold 212 may be neatly fitted to the joint surface of the immovable mold 213. The pair of extrusion pins 218, 218 and a corresponding pair of extrusion pin guide holes 218a, 218a for slidably guiding the extrusion pins 218, 218 are mounted respectively on the fixed base 216 and the movable mold 212 so that distal ends of the extrusion pins 218, 218 may relatively protrude into the cavity 214.

As shown in FIG. 7, in a midsection of the cavity surface 214b of the immovable mold 213 is provided a holding portion 221; the holding portion 221 holds an insert 222 made of iron or containing great amounts of iron. The holding portion 221 assumes the shape of concavity for the purpose of appropriately positioning the insert 222, and has at least a contact surface thereof with the insert 222 magnetized so as to securely hold the insert 222 by a force of magnetic attraction.

Figure 8:
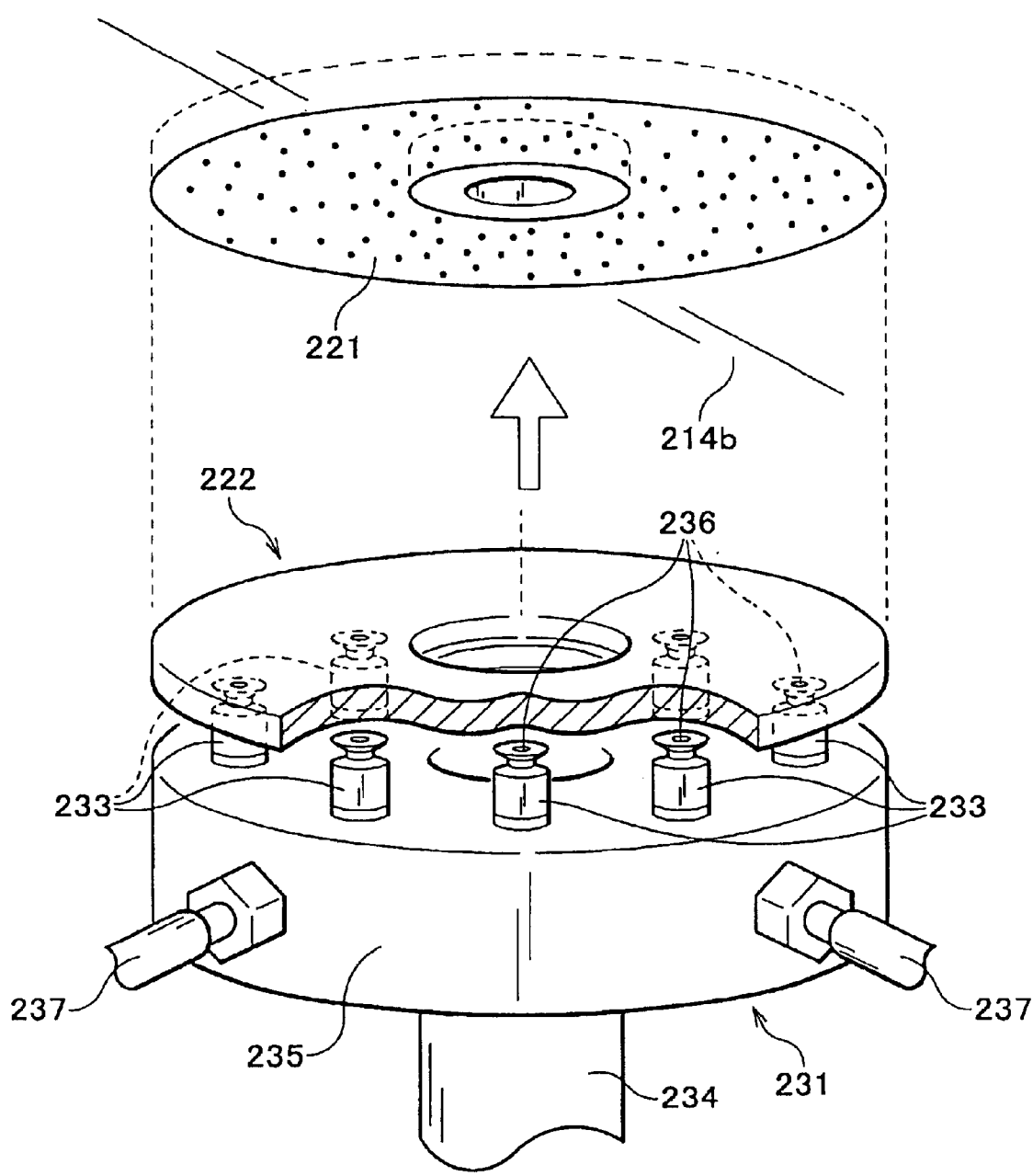
FIG. 8 is a partially cutaway perspective view showing a structure of a handling device for locating an insert in the injection mold according to the second embodiment of the invention.
Figure 9A:
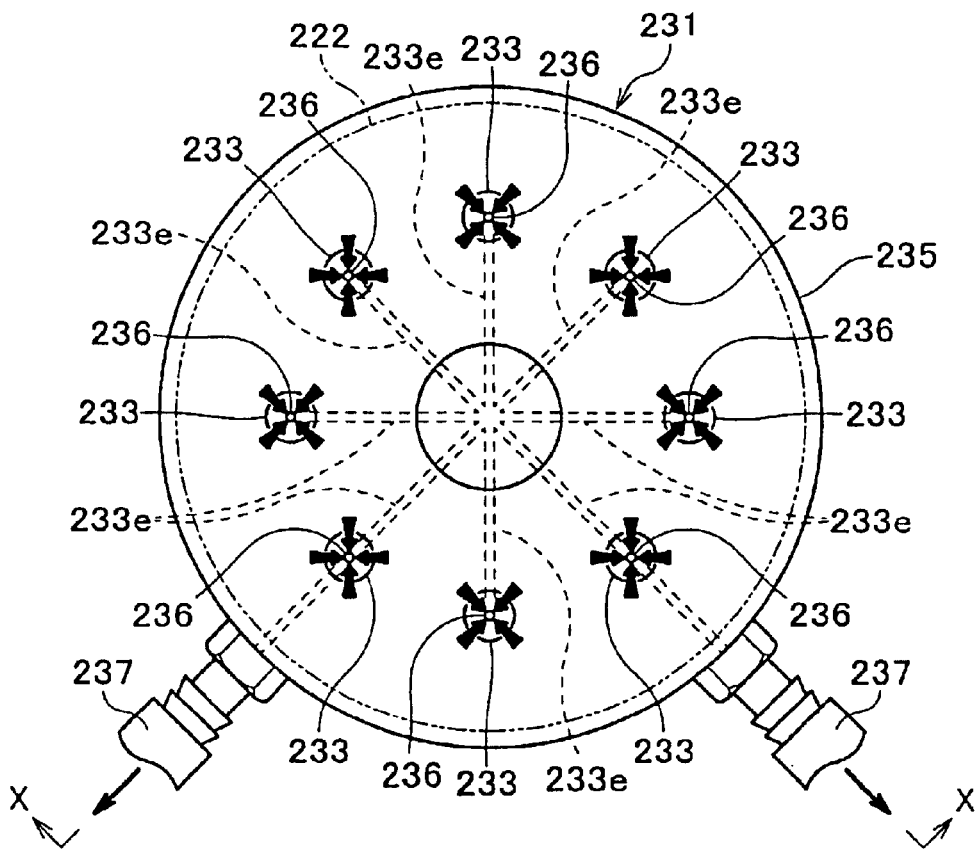
FIG. 9A is a plan view of the handling device for locating an insert in the injection mold according to the second embodiment of the present invention.
Figure 9B:
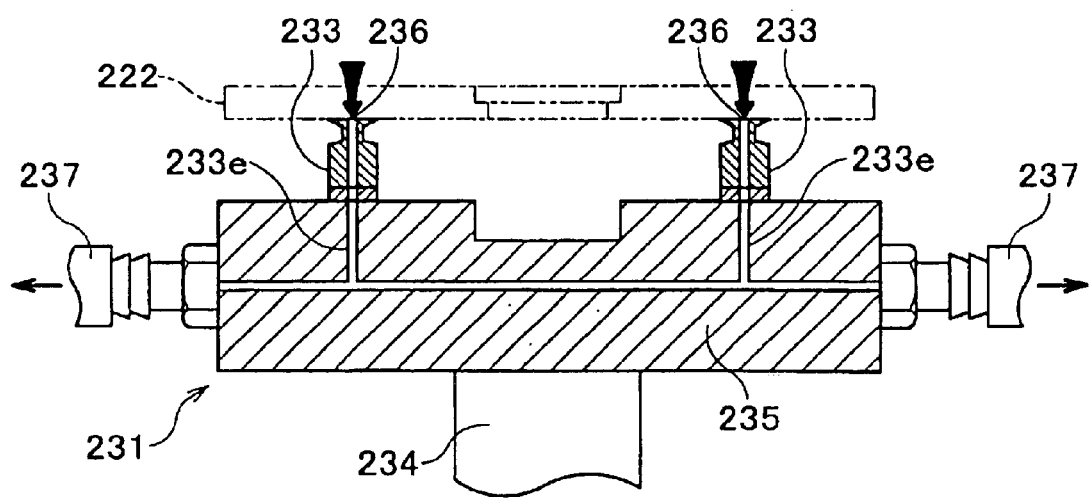
FIG. 9B is a cross section of the handling device taken along line X—X of FIG. 9A.

FIG. 8 shows an outward appearance of a handling device for locating the insert 222 in the holding portion 221; FIGS. 9A and 9B respectively shows a plan view and a sectional view of the handling device.

As illustrated in the drawings, the handling device 231 includes a plurality of attraction grippers 233, 233, . . . for attracting the insert 222, and an arm 234 for locating one insert 222 attracted to these attraction grippers 233, 233, . . . into the holding portion 221 of the immovable mold 213.

The arm 234 is composed of a jointed-arm robot, and the plurality of attraction grippers 233, 233, . . . are attached to a head 235 provided at a distal end of the arm 234; each attraction gripper 233 is spaced from each other around a circumference of the head 235. Each attraction gripper 233 is made of rubber in its entirety. An attraction surface of each attraction gripper 233 is shaped like a cup or suction cup so as to attract and hold the insert 222 without fail, and a suction inlet 236 for generating a negative pressure is provided in a midsection of the attraction gripper 233.

As shown in FIGS. 9A and 9B, the suction inlet 236 of each attraction gripper 233 is connected to a corresponding negative pressure passage 233e each formed in the head 235; the negative pressure passages 233e are connected with a vacuum pump or vacuum tank (not shown) through a vacuum hose 237 and a control valve (not shown).

When the insert 222 is disposed in the holding portion 221 of the immovable mold 213 using the handling device 231, first, the negative pressure passages 233e are connected with the vacuum pump or vacuum tank (not shown) via the vacuum hoses 237 and the control valves (not shown).

Next, the arm 234 is operated to move and rotate each attraction gripper 233 in frontward, rearward, left-hand, right-hand, upward, and downward directions to a position where the insert 222 is picked up. Then, the control valve is switched to a position where the negative pressure passage 233e opens connections to the vacuum pump or vacuum tank with each attraction gripper 233 facing a corresponding spot on the insert 222; thereafter, a negative pressure is generated through the suction inlet 236 of each attraction gripper 233.

Each attraction gripper 233 attracts the insert 122; therefore, if some attraction grippers fail to attract the insert 222 for some reason, the other attraction grippers 233 may attract and hold the insert 222, thus preventing the insert 222 from falling off.

After the insert 22 is attracted and held by the suction negative pressure in each attraction gripper 233, then the arm 234 is operated to move and rotate in frontward, rearward, left-hand, right-hand, upward, and downward directions to carry and fit the insert 222 to the holding portion 221 of the immovable mold 213. Subsequently, the control valve is switched to a position where the negative pressure passage 233e opens connections to an atmosphere releasing port of the control valve, to detach the insert 222 from each attraction gripper 233, 233, . . .

Thereafter, in order to place the next insert 222, the arm 234 is actuated to move and rotate in frontward, rearward, left-hand, right-hand, upward, and downward directions to move the head 235 back to the position where the insert 222 is picked up. It is understood that each attraction gripper 233 may be detachably attached to the head 235 by screws or the like. This construction allows an operator to replace the attraction gripper 233 during an intermission before a subsequent process of injection molding without reducing productivity.

Each attraction gripper 233 may be made of an electromagnet that attracts and holds the insert 222 when magnetism thereof is turned on, and that releases the insert 222 when the magnetism is turned off. This construction may contribute to a simplified structure of the handling device 231 while providing the same level of easy operability as that which achieved with the negative-pressure attraction gripper 233.

Accordingly, if a series of operations as described above is repeatedly performed for one cycle of the injection-molding process, productivity in embedding an insert in the casting may be enhanced. To control the position of the arm 234 and the positioning of the insert 222, a contact sensor such as a microswitch. a relay, etc., or a noncontact sensor such as a magnetic sensor, an optical sensor, etc. may be used.

Thus, attraction and holding of the insert 222 in the holding portion 221 followed by injection of a predetermined amount of fluidized resins into the cavity 214 of which the joint surfaces of the movable mold 212 and the immovable mold 213 are kept in close contact with each other from the resin injection supplying device (not shown) with a screw mechanism or the like actuated allows the insert 222 to be embedded in the fluidized resins injected into the cavity 214, forming the insert-embedded final casting.

Figure 10A:
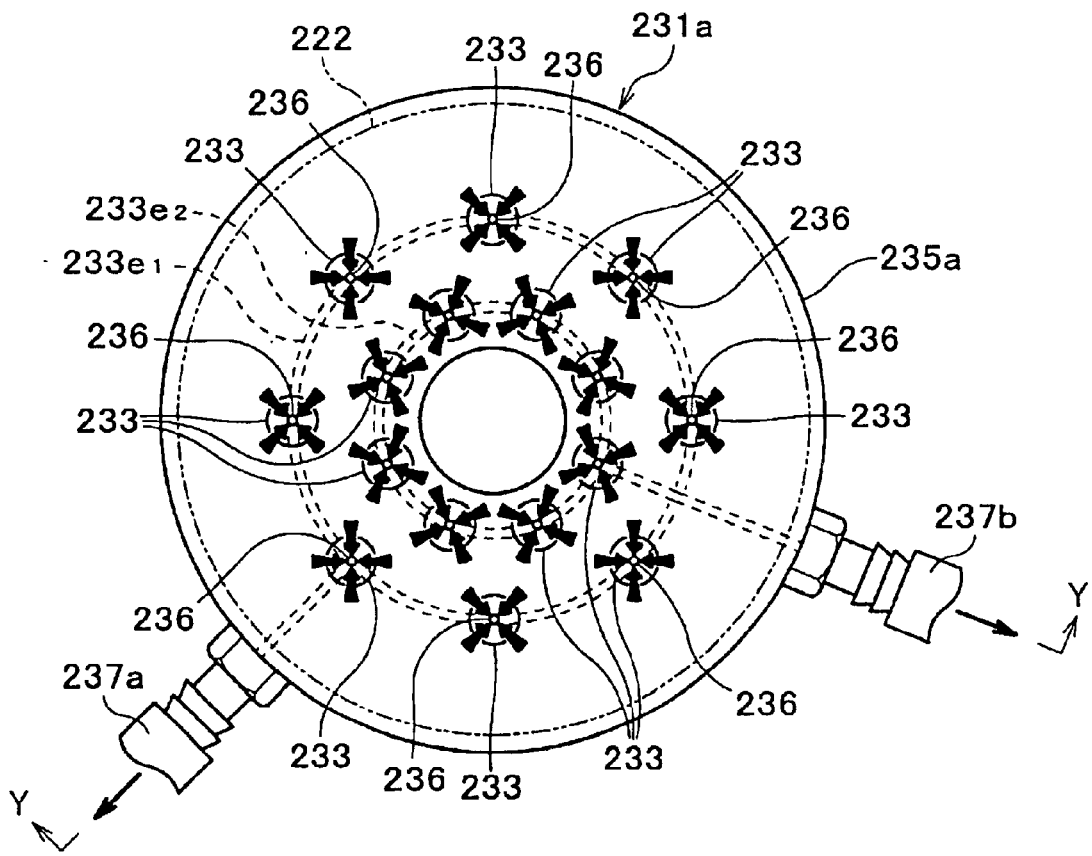
FIG. 10A is a plan view of a variation of the handling device for locating an insert in the injection mold according to the second embodiment of the invention.
Figure 10B:
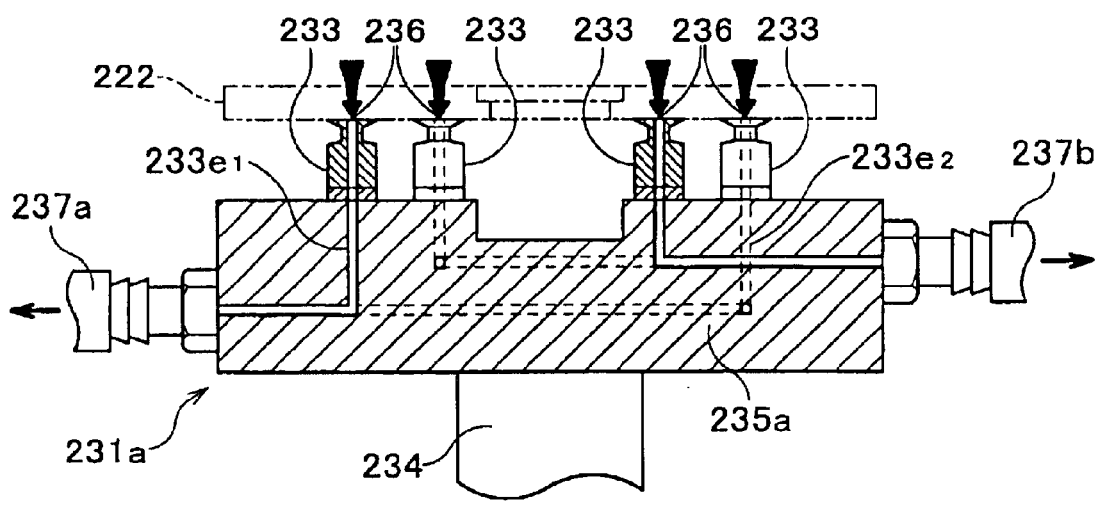
FIG. 10B is a cross section of the handling device taken along line Y—Y of FIG. 10A.

Referring next to FIGS. 10A and 10B, another exemplified embodiment of the handling device is explained herein. The same components as those in the above-described handling device are designated by the same reference numerals, and thus a detailed description will be omitted.

FIG. 10A is a plan view of the handling device; FIG. 10B is a cross-sectional view of the same taken along line Y—Y of FIG. 10. As shown in these drawings, two independent channels of negative pressure passages $233e_1$, $233e_2$, . . . are formed in a head 235a of a handling device 231a. Suction inlets 236, 236, . . . of a plurality of attraction grippers 233, 233, . . . disposed at an outer radius of the head 235a are connected to one negative pressure passage 233e, within the head $235a_1$ while suction inlets 236, 236, . . . of a plurality of attraction grippers 233, 233, . . . disposed at an inner radius of the head 235a are connected to the other negative pressure passage $233e_2$ within the head 235a as well. The one negative pressure passage $233e_1$ and the other negative pressure passage $233e_2$ are connected respectively through vacuum hoses 237a, 237b, and control valves to a vacuum pump or vacuum tank (neither shown).

Accordingly, when each control valve is so switched as to generate a negative pressure in the two channels of the negative pressure passages $233e_1$, $233e_2$, even if any abnormal condition occurs in one of the negative pressure channels that includes the one negative pressure passage $233e_1$, and a plurality of attraction grippers, etc. connected thereto, the other of the negative pressure channels that includes the other negative pressure passage 233e2, a plurality of attraction grippers, etc. connected thereto is used to attract and hold the insert 222.

Similarly, if a specific attraction gripper 233 in each negative pressure channel fails to attract enough to hold the insert 222, the other attraction grippers 233 serve to continuously attract and hold the insert 222; thus, reliability is greatly enhanced in comparison with such an embodiment that only one negative pressure channel is provided.

Figure 11:
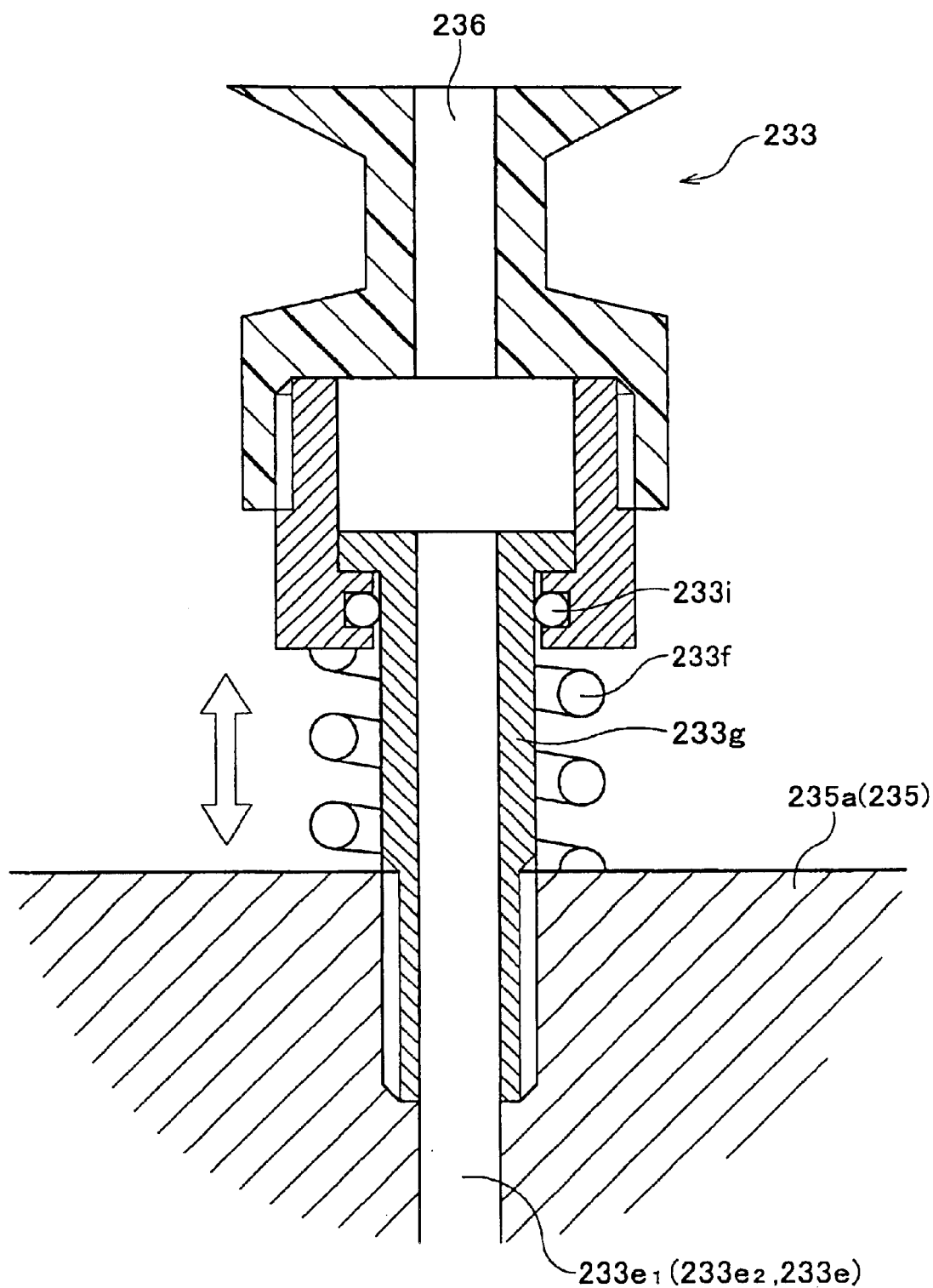
FIG. 11 is a cross section of a preferred example of an attraction gripper, with a principal portion thereof enlarged and illustrated in detail, according to the present invention.
Figure 12A:
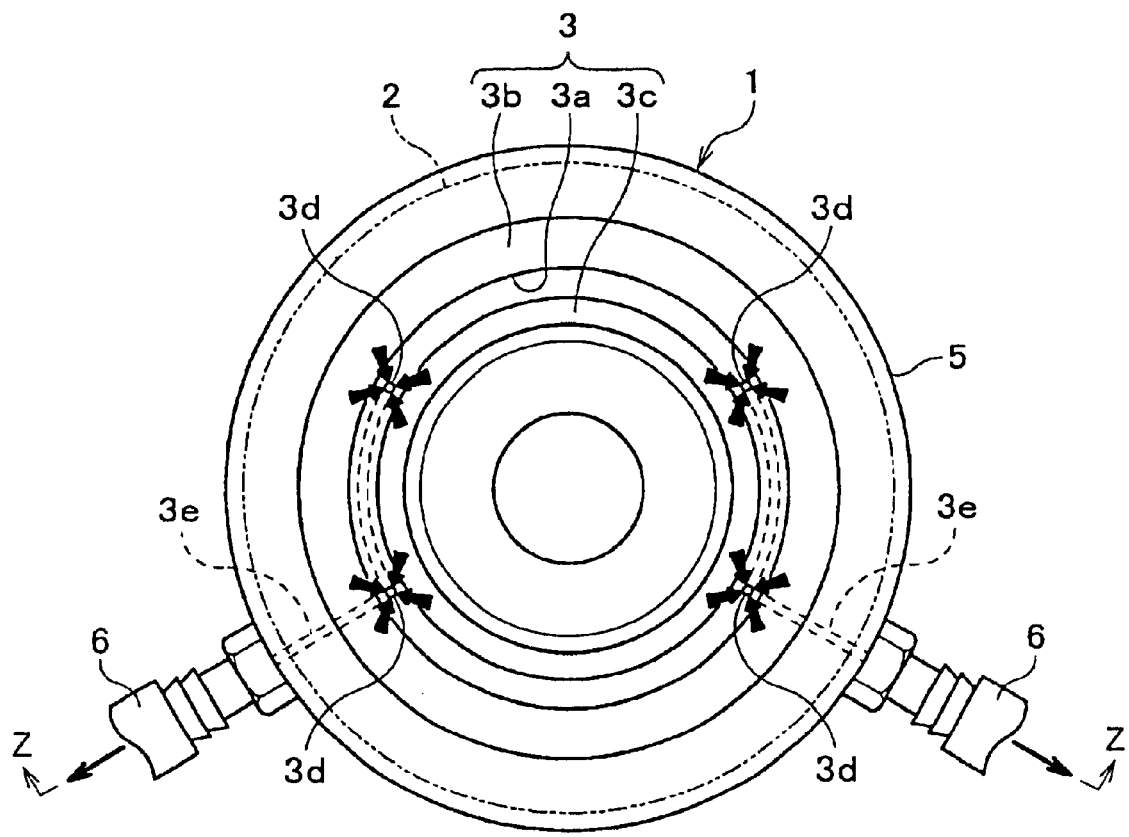
FIG. 12A is a plan view of a conventional handling device and attraction gripper structure thereof for holding an insert.
Figure 12B:
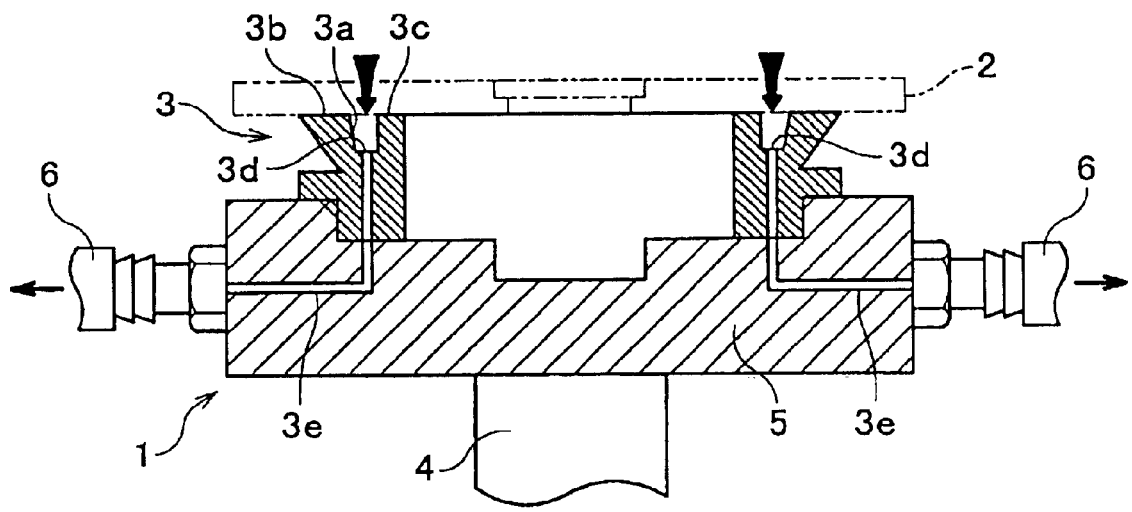
FIG. 12B is a cross section of the conventional handling device and attraction gripper structure thereof taken along line Z—Z of FIG. 12A.
Figure 13A:
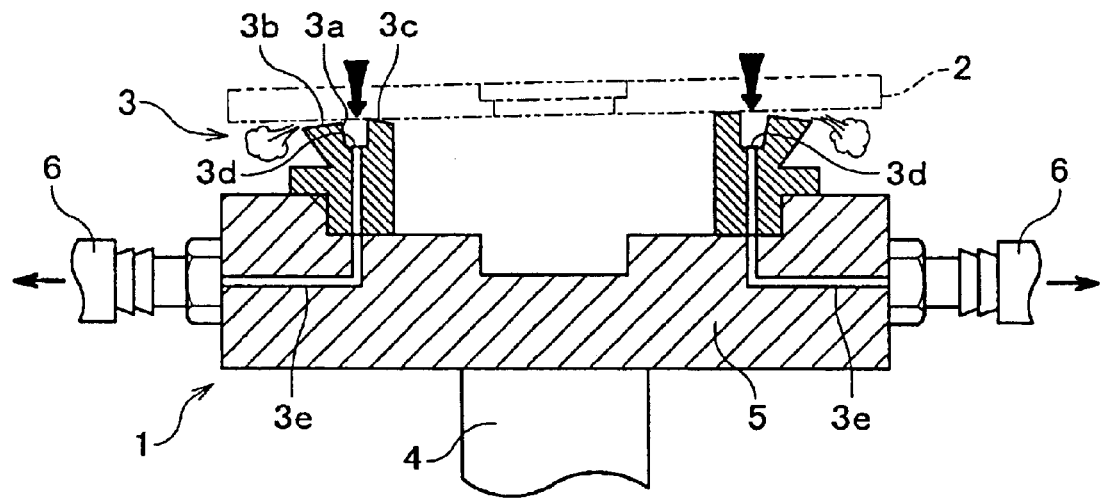
FIG. 13A is a cross section of the conventional handling device and attraction gripper to which an insert fails to be attached because of a curved or uneven shape of the insert.
Figure 13B:
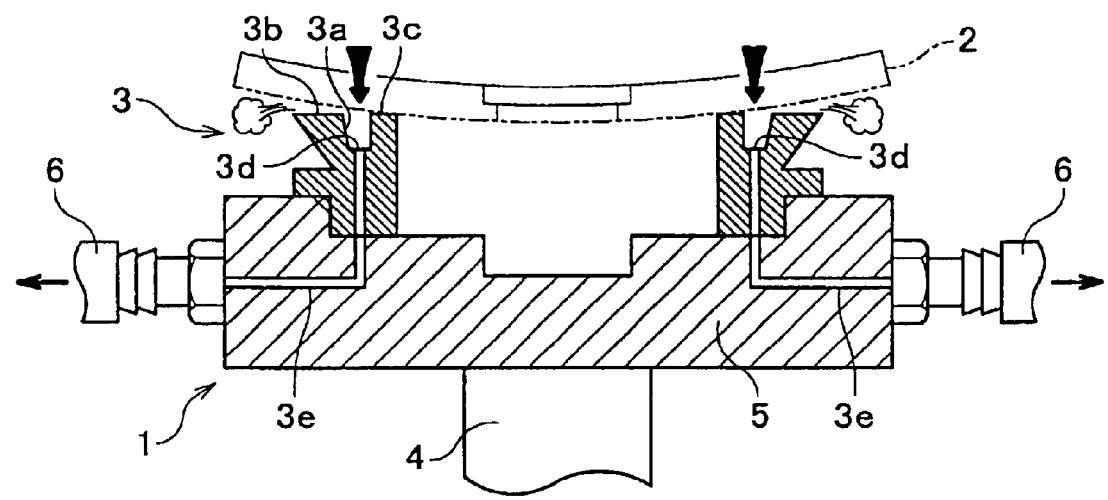
FIG. 13B is a cross section of the conventional handling device attraction gripper to which an insert fails to be attached because of wear and tear or deterioration of components in the attraction gripper.

Another structure as illustrated in FIG. 11 is also applicable in which a plug 233g is attached to the head 235, 235a so as to establish connection with each negative pressure passage 233e, $233e_1$, $233e_2$, and a return spring 233f is provided between a contact surface of each attraction gripper 233 facing the head 235, 235a and the head 235, 235a so that the attraction gripper 233 may vertically move.

This construction serves to cushion or absorb an excessive pressing force that would possibly take place between the handling device and a position where an insert 222 is placed when the insert 222 is picked up or placed, thus preventing each component from getting damaged. In FIG. 11, denoted by 233i is a seal ring that is provided to prevent a leakage of negative pressure.

[Third Embodiment]

Figure 14:
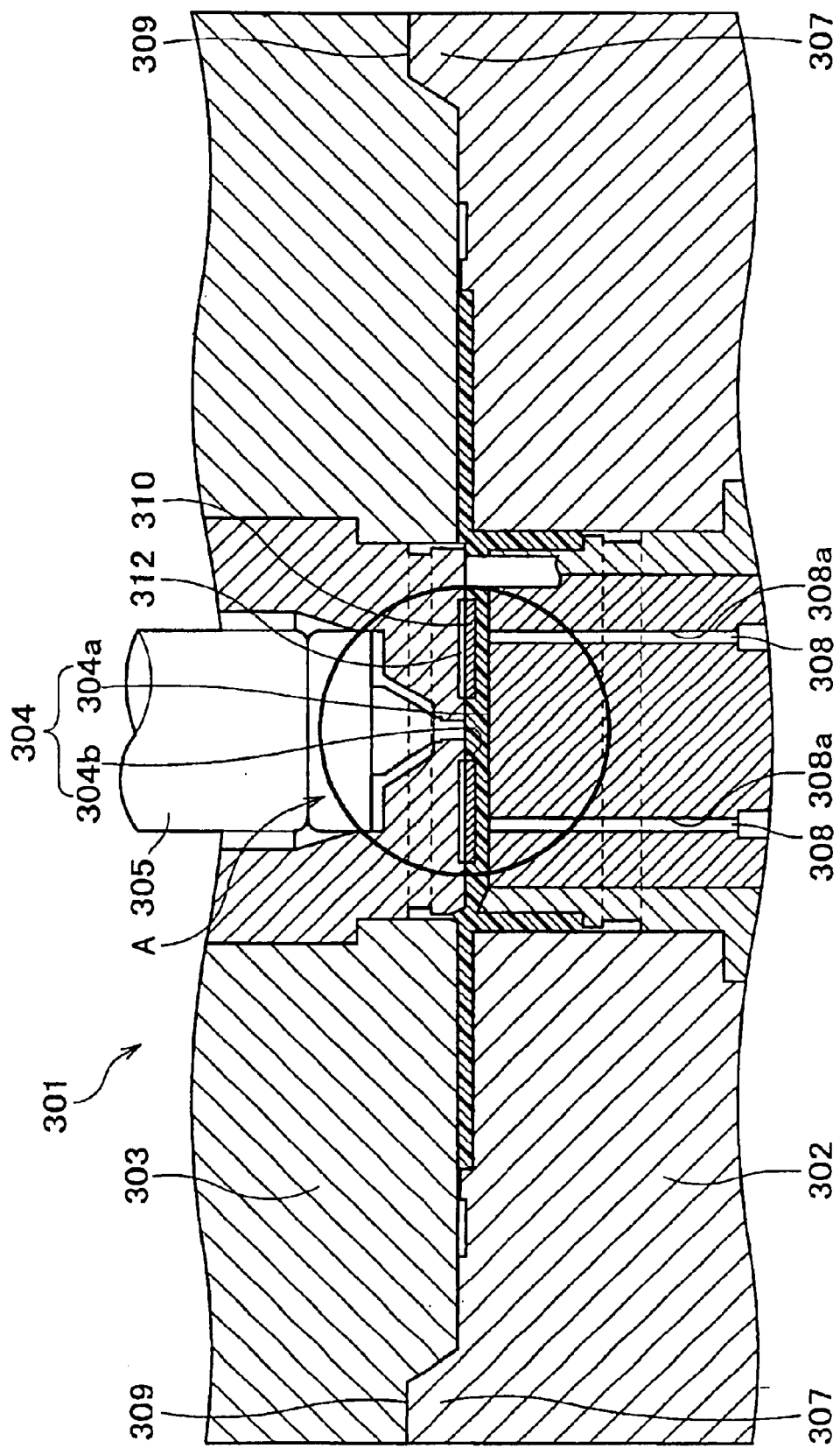
FIG. 14 is a cross section of an internal structure of an injection mold according to a third embodiment of the present invention.
Figure 15A:
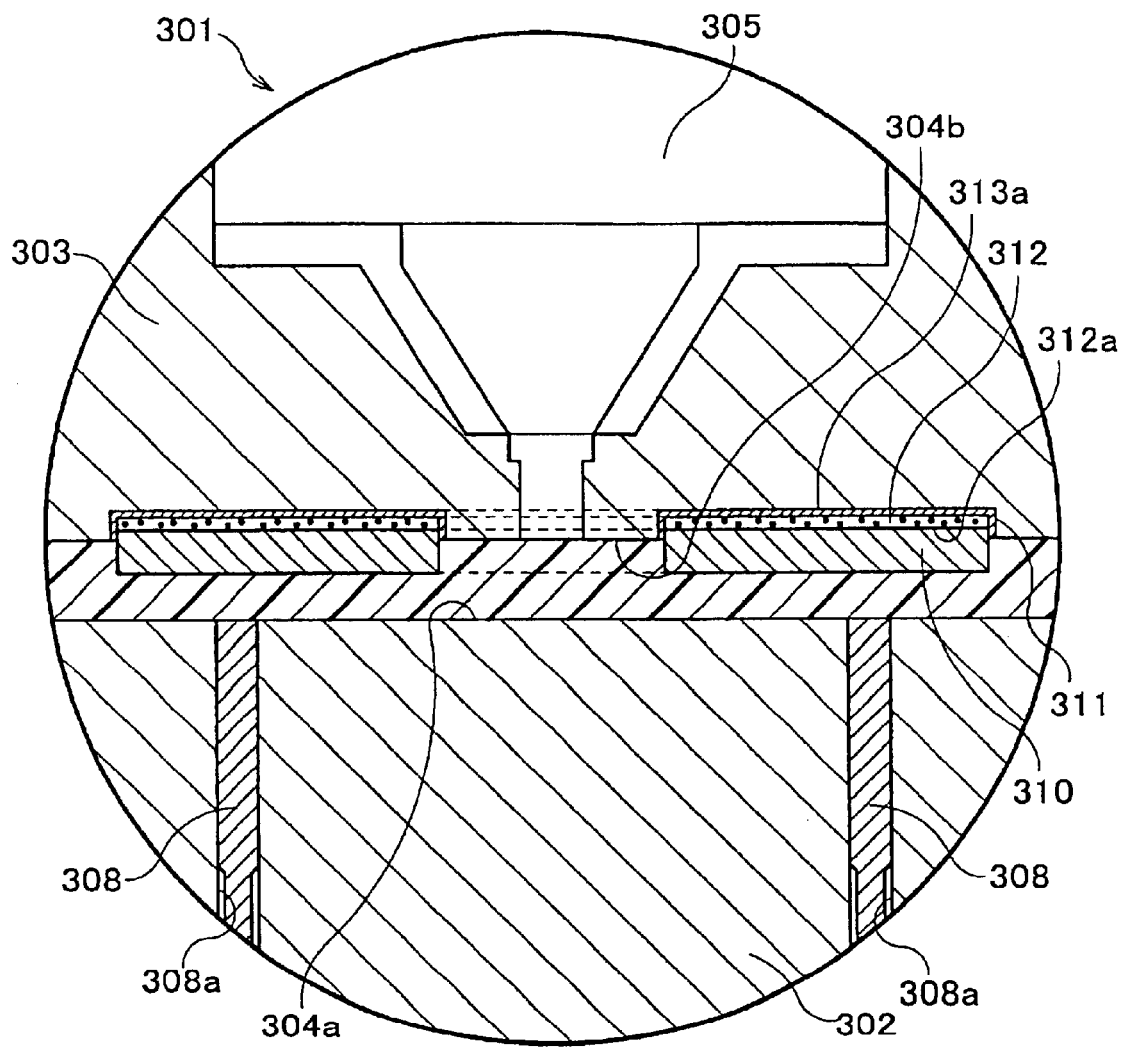
FIG. 15A is an enlarged cross section of a portion A of the injection mold shown in FIG. 14 according to the third embodiment of the present invention.
Figure 15B:
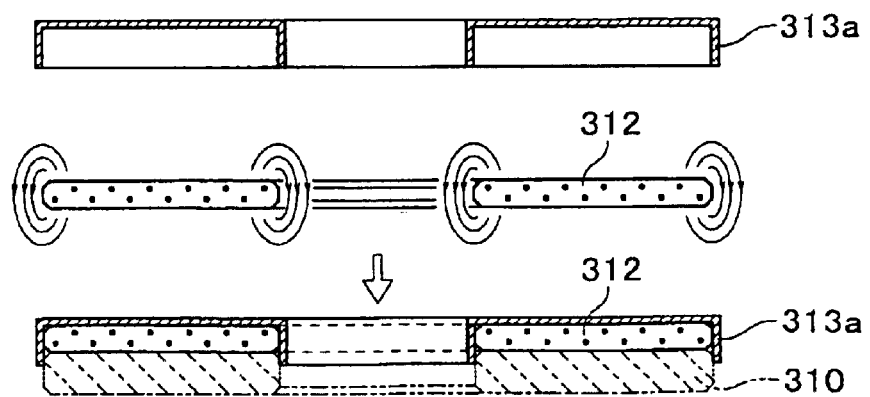
FIG. 15B is a descriptive diagram showing a process for attaching a shield member to a magnet according to the third embodiment of the present invention.
Figure 16:
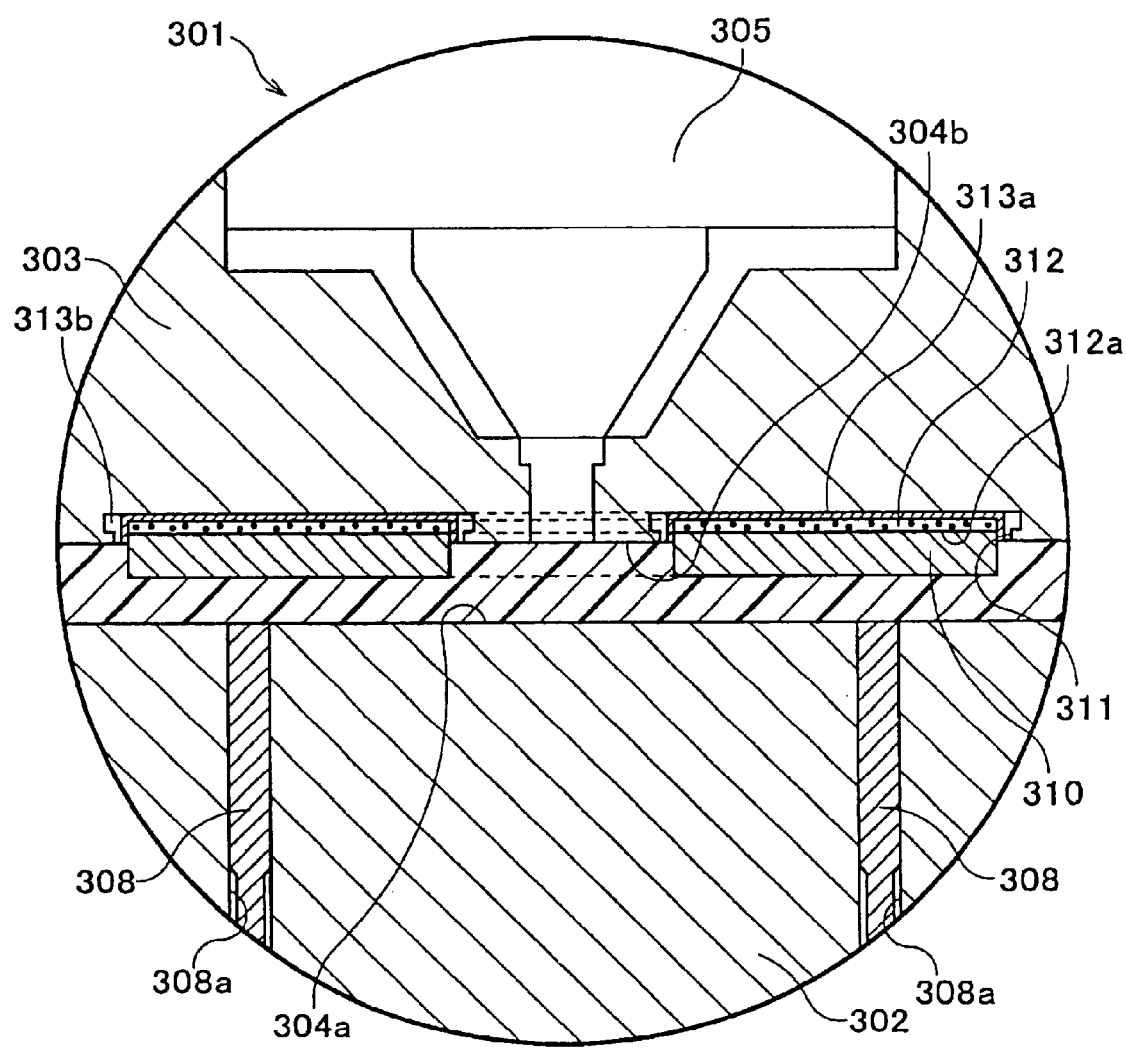
FIG. 16 is a cross section of the portion A of the injection mold shown in FIG. 14, with a principal portion thereof enlarged and illustrated in detail, for showing a variation of the shield member according to the present invention.

Referring next to FIGS. 14 through 16, an example of an injection mold according to a third embodiment of the present invention will be described herein.

FIG. 14 depicts a cross section of an internal structure of the injection mold according to the third embodiment of the present invention. As shown in FIG. 14, an injection mold 301 is separably comprised of a movable mold 302 and an immovable mold 303. Fluidized resins are injected from a nozzle 305 into a cavity 304 formed of a cavity surface 304a of the movable mold 302 and a cavity surface 304b of the immovable mold 303, forming a final casting.

A pair of guide blocks 307, 307 are provided in the movable mold 302, and a pair of guide receiving portions 309, 309 that guides the pair of the guide blocks 307, 307 are provided in the immovable mold 303, so that a joint surface of the movable mold 302 may be precisely joined to a joint surface of the immovable mold 303.

Extrusion pins 308, 308 are slidably guided through extrusion pin guide holes 308a, 308b provided in the movable mold 302. The extrusion pins 308, 308 are so constructed that distal ends of the extrusion pins 308, 308 penetrate into the cavity surface 304a at the movable mold 302 side to extrude a casting as extrusion plate (not shown) extrudes the extrusion pins 308, 308 after the movable mold 302 moves to open the injection mold 301.

As illustrated in FIGS. 15A and 15B in detail, in a midsection of the cavity surface 304b of the immovable mold 303 is provided a holding portion 311 that is shaped like a bowl or a rounded hollow portion to have a ring-shaped insert 310 fitted to and properly positioned in the cavity 304; at a bottom of the holding portion 311 is attached a magnet (permanent magnet or electromagnet) 312 for attracting and holding an insert 310 made of iron or containing great amounts of iron.

A shield member 313a is provided between the magnet 312 and the holding portion 311 to prevent a leakage of a magnetic flux from the magnet 312 into the immovable mold 303. The shield member 313a consists, for example, of magnetic shield material such as silica ceramic, and covers an entire surface of the holding portion 311 except an attraction surface 312a of the magnet 312 to be brought into contact with the insert 310. In this instance, the material and thickness of the shield member 313a are determined according to leakage properties of a magnetic flux so that such a leakage of a magnetic flux is restricted to prevent a magnetic attraction from decreasing.

As described above, provision of the magnet 312 at the bottom of the holding portion 311 and the shield member 313a as a magnetic shielding between the magnet 312 and the immovable mold 303 allows the shield member 313a to block a magnetic flux leaking from the magnet 312 into the immovable mold 303, thus serving to retain an intrinsic strong magnetic attraction of the magnet 312, so that the insert 310 may be held at an insert position in the immovable mold 303 without falling off. Accordingly, defective molding of a casting due to falling off of the insert 310 may be prevented.

FIG. 16 shows a variation of the instant embodiment in which space is provided as a shielding means instead of the shield member 313a.

As shown in FIG. 16, space 313b as a shielding means is formed all around between an inner annular surface of the holding portion 311 and an outer annular surface of the magnet 312 fixed on the bottom of the holding portion 311. The depth of the space 313b reaches the bottom of the holding portion 311, and the distance in a direction of the radius is determined according to magnetic intensity of the magnet 312 so as not for the magnetic flux of the magnet 312 to reach the immovable mold 303.

Consequently, like the above embodiment in which the shield member 313a is provided, the leakage of the magnetic flux into the immovable mold 303 is shielded by the space 313b as a shielding means, and thus a decrease in magnetic attraction exerted by the magnet 312 is prevented.

Optionally, a shield plate (not shown) made for example of magnetic shielding material such as silica ceramic may be provided between the bottom of the holding portion 311 and the magnet 312. The above-described shield member 313a may be so provided as to cover an entire surface of the holding portion 311 except the attraction surface 312a of the magnet 312. This additional structure serves to prevent a leakage of the magnetic flux of the magnet 312 into the immovable mold 303 more effectively.

Next, a brief description will be given of a structure of a handling device for placing the insert 310, and a process of handling the insert 310 with reference to FIGS. 17 and 18.

Figure 17:
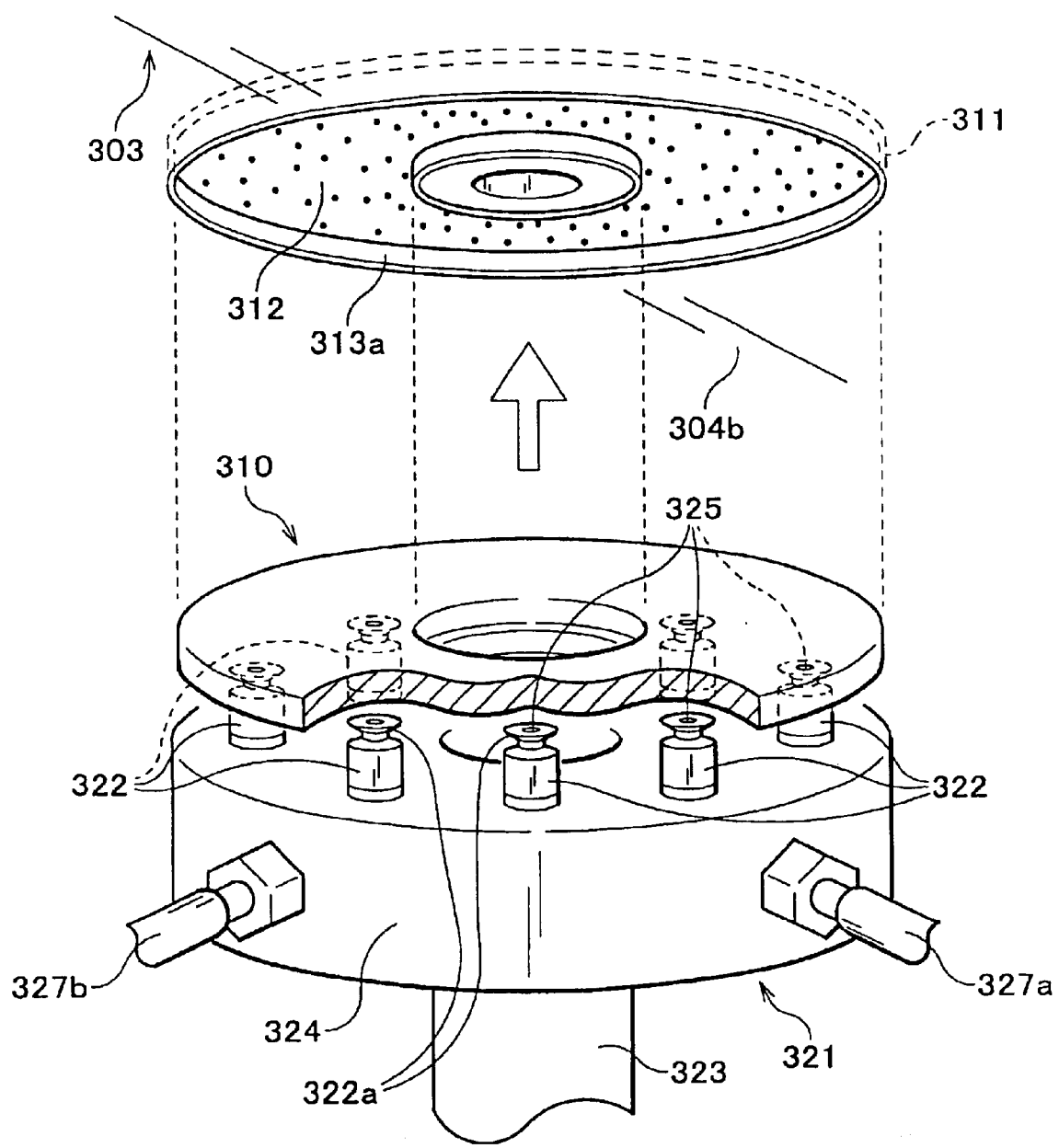
FIG. 17 is a partially cutaway perspective view showing a structure of a handling device for locating an insert in the injection mold according to the third embodiment of the present invention.

FIG. 17 shows a structure of a distal-end side of the handling device; FIG. 18 shows a cross section of the distal-end side of the handling device.

As illustrated in FIG. 17, the handling device 321 includes a plurality of attraction grippers 322, 322, . . . for attracting the insert 310, and an arm 323 for carrying and locating one insert 310 attracted to these attraction grippers 322, 322, . . . in the holding portion 311 of the immovable mold 323; thereby the insert 310 is attracted and held by the magnet 312 in the holding portion 311.

The arm 323 is composed of a jointed-arm robot, and the plurality of attraction grippers 322, 322, . . . are attached to a head 324 provided at a distal end of the arm 324; each attraction gripper 322 is spaced from each other around a circumference of the head 234. An attraction surface 322a of each attraction gripper 322, which is for example made of rubber, is shaped like a cup or suction cup so as to attract and hold the insert 310 without fail, and a suction inlet 325 for sucking to generate a negative pressure is provided in a midsection of the attraction gripper 322.

Figure 18:
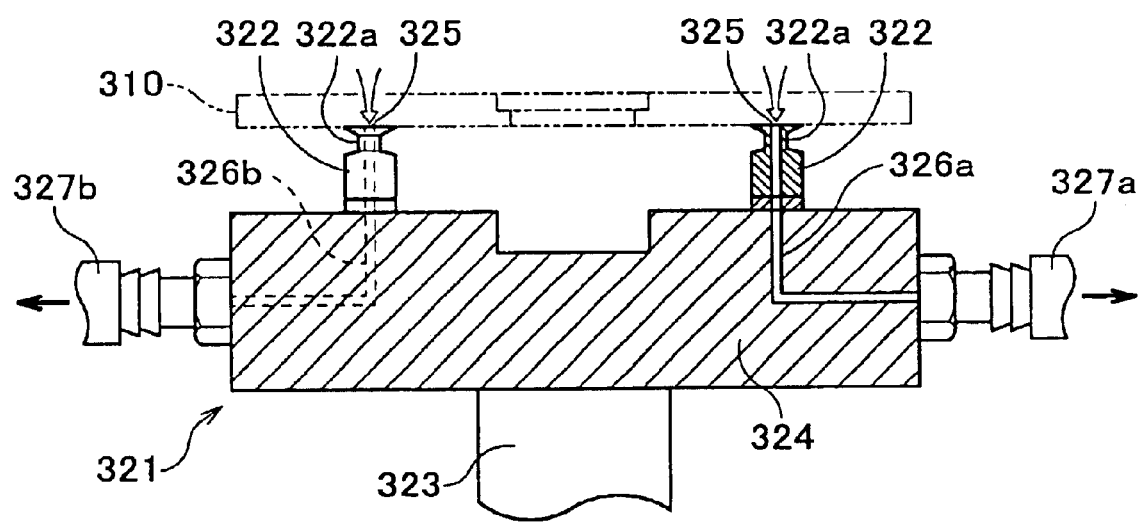
FIG. 18 is a cross section of a structure of the handling device according to the third embodiment of the present invention.

As shown in FIG. 18, independent negative pressure passages 326a, 326b are formed in the head 324 of the arm 323. Some of the suction inlets 325, 325, . . . of the attraction grippers 322, 322, . . . that are circumferentially disposed alternately are connected to the negative pressure passage 326a; the other suction inlets 325, 325, . . . are connected to the negative pressure passage 326b. Each of the negative pressure passages 326a, 326b is connected with a vacuum pump or vacuum tank (neither shown) through a vacuum hose 327a, 327b respectively and a corresponding control valve (not shown), thus each constituting an independent negative pressure circuit.

When the insert 310 is disposed in the holding portion 311 of the immovable mold 303 using the handling device 321, the negative pressure passages 326a, 326b are connected with the vacuum pump or vacuum tank (not shown) via the corresponding vacuum hoses 327a, 327b and control valves (not shown).

Next, the arm 323 is operated to move and rotate each attraction gripper 322 in frontward, rearward, left-hand, right-hand, upward, and downward directions to a position where the insert 222 is picked up, so that each attraction gripper 322 may face a corresponding spot on the insert 310. This position being kept, the control valves (not shown) are then switched respectively to a position where the negative pressure passages 326a, 326b open connections to the vacuum pump or vacuum tank; thus, a negative pressure is generated through the suction inlet 325 of each attraction gripper 322 to initiate attracting and holding the insert 310.

Each attraction gripper 322 attracts and holds the insert 310; therefore, if some attraction grippers 322, 322, . . . fail to attract the insert 310 for some reason, the other attraction grippers 233 may attract and hold the insert 310, while if any abnormal condition occurs in one of the negative pressure circuits, the other of the negative pressure circuits may serve to continuously attract enough to hold the insert 310.

After the insert 310 is attracted and held by the suction negative pressure in each attraction gripper 322, then the arm 323 is operated to move and rotate in frontward, rearward, left-hand, right-hand, upward, and downward directions to carry and fit the insert 310 into the holding portion 311 of the immovable mold 303. Subsequently, the control valves are switched to a position where the negative pressure passages 326a, 326b open connections to an atmosphere releasing port of each control valve, to detach the insert 310 from each attraction gripper 322, 322, . . . , waiting for the next handling operation to initiate.

Consequently, if a series of operations of the arm 323 as described above is repeatedly performed for one cycle of the injection-molding process, productivity in embedding an insert in the casting may be enhanced.

In the instant embodiment, the shield member 313a may be coated on the magnet 312, or adhered on the magnet 312 with a bonding material.

Moreover, the attraction surface 312a of the magnet 312 to be brought into contact with the insert 310 may be in the form of a contiguous flat surface to which the insert 310 may be attracted.

An outer surface of the shield member 313a and the attraction surface 312a of the magnet 312 may be in the form of a contiguous surface that continues to the cavity surface 304b of the immovable mold 303, so that the perimeter of the shield member 313a is an integral part of the cavity surface 304b.

Further, the attraction grippers 322, 322, . . . may be circumferentially and radially spaced apart, and some of the suction inlets 325, 325 of the attraction grippers 322, 322, . . . provided at an inner or outer radius of the head 324 are connected to one of the negative pressure passage 326a, 326b formed in the head 324 of the arm 323, while the other suction inlets 325, 325, . . . of the attraction grippers 322, 322, . . . are connected to the other of the negative pressure passage 326a, 326b, so that two independent negative pressure circuits are provided.

Although the preferred embodiments of the present invention have been described above, various modifications and changes may be made in the present invention without departing from the spirit and scope thereof.

The present invention as described in the first embodiment is configured to supply a high-pressure gas into a cavity comprised of a movable mold and an immovable mold during a time period after completion of forming a casting till an injection mold opens partway, and to allow the high-pressure gas to jet out through a clearance formed between joint surfaces of the movable and immovable molds while the injection mold is opening, thereby cleaning the inside of the cavity, when a resin is injected into the injection mold to form the casting. Therefore, a cycle of cleaning extraneous matter may be greatly extended. Furthermore, a cycle of suspension of the line may be greatly extended, and thus manufacturability thereof is improved and costs may be saved.

The present invention as described in the second embodiment is configured to place an insert in an injection mold in such a manner that a plurality of attraction grippers are used to hold, move and place the insert at a predetermined position in the injection mold, and thus may facilitate precise placement of the insert at the predetermined position in the projection mold because even if one of the attraction grippers fails to hold the insert, the others can hold the insert. Moreover, the instant embodiment serves to improve productivity and to cut down costs.

The present invention as described in the third embodiment is configured to prevent a poor holding such as displacement of the insert, and thus the casting with the insert embedded therein may be manufactured with a high degree of accuracy, and yields may be considerably enhanced.

What is claimed is:

1. A method of removing extraneous matter in an injection mold having a cavity comprised of a movable mold and an immovable mold into which injection mold a resin is injected to form a casting, the method comprising:

supplying a high-pressure gas into the cavity during a time period after completion of forming the casting until the injection mold opens partway;

allowing the high-pressure gas to jet out through a clearance formed between joint surfaces of the movable and immovable molds while the injection mold is opening, whereby a nonvolatile component of the resin is discharged, and wherein the movable mold moves at a very low velocity for only an initial period of time while the injection mold is opening, keeping the clearance very small.

2. A method of removing extraneous matter in an injection mold having a cavity comprised of a movable mold and an immovable mold into which injection mold a resin is injected to form a casting, the method comprising:

supplying a high-pressure gas into the cavity during a time period after completion of forming the casting until the injection mold opens partway; and allowing the high-pressure gas to jet out through a clearance formed between joint surfaces of the movable and immovable molds while the injection mold is opening, whereby a nonvolatile component of the resin is discharged, and wherein the clearance formed between joint surfaces of the movable and immovable molds is restricted to a very small level for a predetermined period immediately after the injection mold starts opening; and wherein the movable mold is allowed to move at a normal velocity after an expiration of the predetermined period.

3. A method of removing extraneous matter in an injection mold having a cavity comprised of a movable mold and an immovable mold into which injection mold a resin is injected to form a casting, the method comprising:

supplying a high-pressure gas into the cavity during a time period after completion of forming the casting until the injection mold opens partway; and allowing the high-pressure gas to jet out through a clearance formed between joint surfaces of the movable and immovable molds while the injection mold is opening, whereby a nonvolatile component of the resin is discharged, and wherein the clearance formed between joint surfaces of the movable and immovable molds is determined according to viscosity of a material to be formed.

4. A method according to claim 1, wherein atmosphere in the cavity is evacuated before supplying the high-pressure gas into the cavity.

5. A method according to claim 2, wherein atmosphere in the cavity is evacuated before supplying the high-pressure gas into the cavity.

6. A method according to claim 3, wherein atmosphere in the cavity is evacuated before supplying the high-pressure gas into the cavity.

* * * * *